United States Patent
Tsui et al.

(10) Patent No.: US 9,781,685 B2
(45) Date of Patent: Oct. 3, 2017

(54) SELF-ADAPTIVE COVERAGE OF WIRELESS NETWORKS

(71) Applicant: AT&T Intellectual Property I, L.P., Atlanta, GA (US)

(72) Inventors: Ernest Tsui, Pleasanton, CA (US); Srikanth Hariharan, Sunnyvale, CA (US); Vibhav Kapnadak, Milpitas, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 424 days.

(21) Appl. No.: 14/086,952

(22) Filed: Nov. 21, 2013

(65) Prior Publication Data

US 2015/0141027 A1    May 21, 2015

(51) Int. Cl.
| | |
|---|---|
| *H04B 1/00* | (2006.01) |
| *H04W 52/24* | (2009.01) |
| *H04W 24/02* | (2009.01) |
| *H04W 52/14* | (2009.01) |
| *H04W 52/18* | (2009.01) |
| *H04W 52/28* | (2009.01) |
| *H04B 17/345* | (2015.01) |

(52) U.S. Cl.
CPC ......... *H04W 52/243* (2013.01); *H04W 24/02* (2013.01); *H04B 17/345* (2015.01); *H04W 52/143* (2013.01); *H04W 52/146* (2013.01); *H04W 52/18* (2013.01); *H04W 52/283* (2013.01)

(58) Field of Classification Search
CPC . H04W 72/082; H04W 52/244; H04W 36/20; H04B 1/1027; H04J 11/005

USPC .......... 455/63.1, 114.2, 278.1, 296
See application file for complete search history.

(56) References Cited

U.S. PATENT DOCUMENTS

| | | | |
|---|---|---|---|
| 5,260,968 A | 11/1993 | Gardner et al. | |
| 6,128,276 A | 10/2000 | Agee | |
| 6,229,486 B1 | 5/2001 | Krile | |
| 6,459,895 B1 | 10/2002 | Hastings et al. | |
| 6,486,828 B1 | 11/2002 | Cahn et al. | |
| 6,509,865 B2 | 1/2003 | Takai | |
| 6,720,936 B1 | 4/2004 | Koolish et al. | |

(Continued)

FOREIGN PATENT DOCUMENTS

EP    962064 B1    8/1999

OTHER PUBLICATIONS

Hoglund, et al. "Automated optimization of key WCDMA parameters," Wireless Communications and Mobile Computing 5.3 (2005): pp. 257-271. John Wiley & Sons.

(Continued)

*Primary Examiner* — Mazda Sabouri
*Assistant Examiner* — Edward Zhang
(74) *Attorney, Agent, or Firm* — Amin, Turocy & Watson, LLP

(57) ABSTRACT

Both uplink spectral efficiency and downlink spectral efficiency are improved through adjustments made to various parameters that would otherwise be treated as static type parameters. Variations in respective performance of two or more cells can be considered during the adjustment. Further, variations of respective cell performance based on time of day/week are considered and compensated for through various adjustments. Such timely adaptations are applied in order to improve the performance of each cell, during each time of day/week.

20 Claims, 21 Drawing Sheets

(56) References Cited

U.S. PATENT DOCUMENTS

| | | |
|---|---|---|
| 6,795,409 B1 | 9/2004 | Youssefmir et al. |
| 6,839,573 B1 | 1/2005 | Youssefmir et al. |
| 6,982,968 B1 | 1/2006 | Barratt et al. |
| 7,054,292 B2 | 5/2006 | Hall et al. |
| 7,184,795 B2 | 2/2007 | Mizuguchi |
| 7,437,166 B2 | 10/2008 | Osseiran et al. |
| 7,439,918 B2 | 10/2008 | Iwai et al. |
| 7,489,932 B2 | 2/2009 | Chari et al. |
| 7,502,592 B2 | 3/2009 | Yamamoto et al. |
| 7,532,660 B2 | 5/2009 | Chae et al. |
| 7,720,437 B2 | 5/2010 | Weller et al. |
| 7,742,788 B2 | 6/2010 | Frank |
| 7,751,854 B2 | 7/2010 | Leifer et al. |
| 7,805,144 B2 | 9/2010 | Sousa et al. |
| 8,125,386 B2 | 2/2012 | Henderson et al. |
| 8,265,630 B2 | 9/2012 | Proctor, Jr. |
| 8,385,305 B1 | 2/2013 | Negus et al. |
| 9,144,084 B2* | 9/2015 | Sadek .................. H04W 16/14 |
| 2004/0033818 A1* | 2/2004 | Nakamura ........... H01Q 3/2605 |
| | | 455/562.1 |
| 2004/0106412 A1* | 6/2004 | Laroia .................. H04W 16/12 |
| | | 455/448 |
| 2011/0212731 A1* | 9/2011 | Lee ....................... H04W 28/26 |
| | | 455/450 |
| 2011/0237243 A1* | 9/2011 | Guvenc ................. H04L 5/0032 |
| | | 455/423 |
| 2012/0113844 A1* | 5/2012 | Krishnamurthy ..... H04L 1/0026 |
| | | 370/252 |
| 2013/0084814 A1 | 4/2013 | Uno et al. |
| 2013/0150035 A1* | 6/2013 | Chande ................. H04W 60/00 |
| | | 455/435.1 |
| 2013/0165176 A1* | 6/2013 | Carter .................. H04W 52/346 |
| | | 455/522 |
| 2014/0119223 A1* | 5/2014 | Song ................... H04W 72/085 |
| | | 370/252 |

OTHER PUBLICATIONS

Hoglund, et al, "Quality-based auto-tuning of cell uplink load level targets in WCDMA," Proceedings of the 57th IEEE Vehicular Technology Conference, 2003, VTC 2003-Spring, vol. 4, pp. 2847-2851.

Hedby, et al. "Design of Energy-Aware Networking and Cooperation Mechanisms" FP7 Information & Communication Technologies (ICT) CONSERN, Deliverable D3.2, Feb. 28, 2011. Published online at [http://kandalf.di.uoa.gr/consern/attachments/article/136/CONSERN_D3%202_Design%20of%20 Energy-Aware %20Networking%20and%20Cooperation%20Mechanisms.pdf], 80 pages.

* cited by examiner

SELF-ADAPTIVE COVERAGE OF WIRELESS NETWORKS

TECHNICAL FIELD

The subject disclosure relates to wireless communications and, also generally, to self-adaptive coverage of wireless networks.

BACKGROUND

Wide adoption of mobile devices along with ubiquitous cellular data coverage has resulted in an explosive growth of mobile applications that expect always-accessible wireless networking. This explosion has placed strains on spectrum resources that are scarce in the mobile world. On the user side, dropped calls and poor quality communication have been blamed for user dissatisfaction. On the network side, instances of dropped calls and poor quality communication can occur due to the explosion in wireless demand and the limited amount of spectrum available to support the demand.

BRIEF DESCRIPTION OF THE DRAWINGS

Various non-limiting embodiments are further described with reference to the accompanying drawings in which.

DETAILED DESCRIPTION

Figure 1:
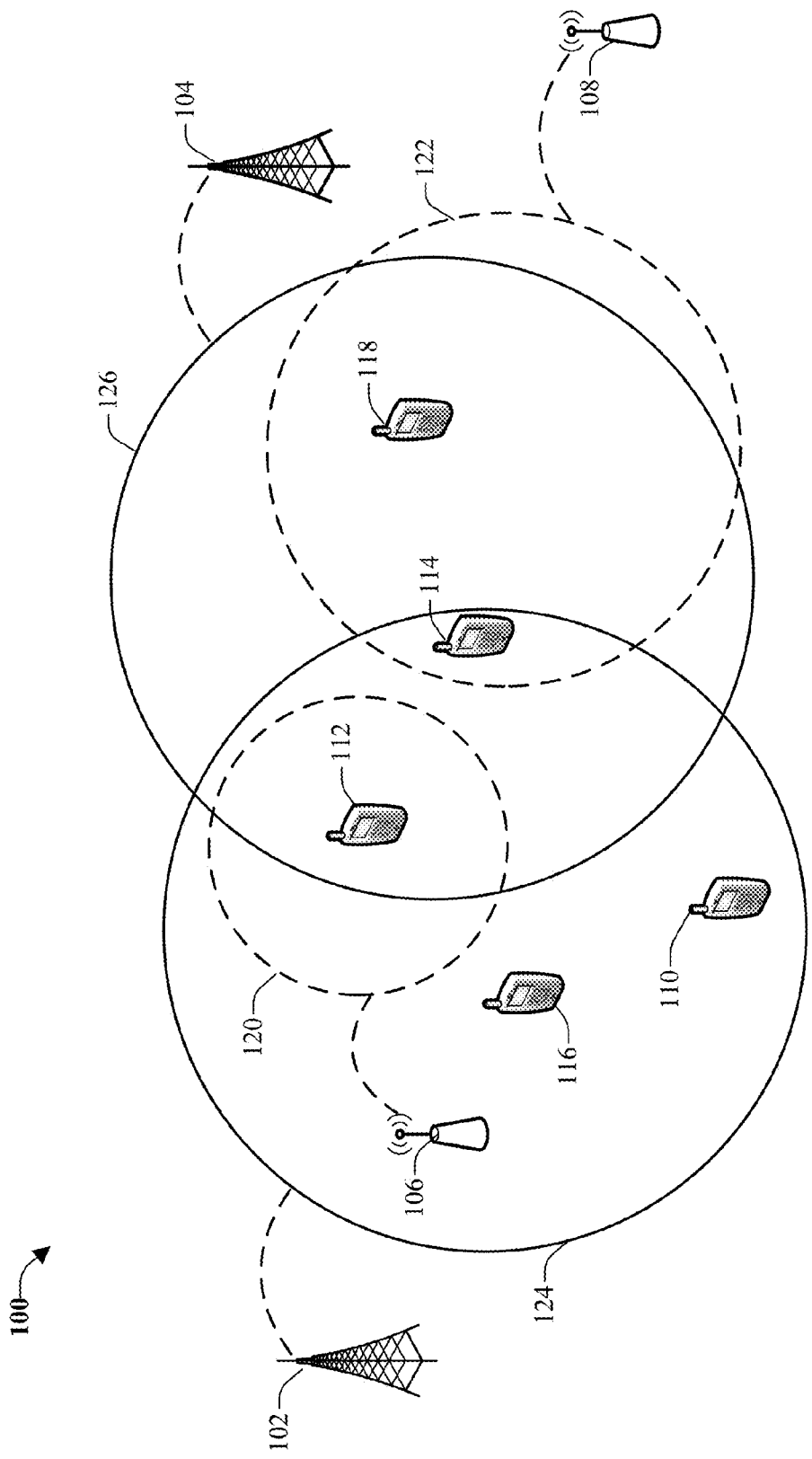
FIG. 1 illustrates an example, non-limiting wireless communications environment that can be utilized with the disclosed aspects.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed aspects are configured to facilitate adjustments to normally static-type settings (e.g., settings that are usually held at a constant level) in order to make improvements to the spectral efficiency of each cell and during each period of the day. Cell performance can vary greatly per cell and also over the time of day for a given cell. Therefore, the disclosed aspects include timely adaptations that can be implemented per cell and/or time of day.

One or more aspects disclosed herein relate to reducing a total combined interference on the uplink and the downlink. Further aspects include increasing network capacity and throughput. Another aspect relates to monitoring identified performance indicators (sometimes referred to as key performance indicators or "KPIs") and improving these indicators, while maintaining adequate coverage for mobile devices within the coverage area of certain cell sites in the network.

An approach discussed herein relates to balancing the network load for all sector faces, including co-located sectors of other NodeBs or base stations, for example. Further, cell coverage overlap can be reduced in order to eliminate detected set members to the extent possible. Further, as it relates to a Universal Mobile Telecommunications System (UMTS) implementation, detected set members can be grouped or forced into an active set membership.

Various metrics can be utilized for balancing the network load including, but not limited to identified success metrics (or key success metrics or indicators), which can include throughput, call drop, and so on. Another metric includes identified objective metrics (or key objective metrics), which can include interference measures as well as other measurements. Further, various settings can be adjusted, which can include configuration parameters as well as other settings.

It is noted, for the avoidance of doubt, any embodiments described herein in the context of "optimizing" spectral availability and/or performance are not so limited. Instead such terms should be considered also to cover any techniques that implement underlying aspects or parts of the below-described aspects to improve or increase spectral availability, and/or performance, even if resulting in a suboptimal variant obtained by relaxing aspects or parts of a given implementation or embodiment. Further, although various performance indicators, metrics, success metrics, and/or objective metrics might be described as "key", such term can apply to different indicators and/or metrics as determined during implementation of the disclosed aspects. For example, what might be considered "key" in a first implementation might not be considered "key" in a second implementation or in other implementations.

FIG. 1 illustrates an example, non-limiting wireless communications environment 100 that can be utilized with the disclosed aspects. The wireless communications environment 100 can include a multitude of wireless communications networks, each having a respective coverage area. The coverage area of some of the wireless communications networks can overlap such that one or more mobile devices might be served by any of the network devices whose coverage areas overlap. For example, the networks might overlap in accordance with different radio access technologies and may also overlap in radio range such that a first network is capable of receiving signals broadcast by one or more other networks. Further, the wireless communications environment 100 can be a heterogeneous environment that includes heterogeneous networks, which can include multiple different types of cells such as, for example, macro cells, metro cells, femto cells, micro cells, pico cells, and so forth.

A macro cell is a cell in a wireless communications system that provides radio coverage served by a high power cellular access point (or base station) and, therefore has a large coverage area, such as a range of tens of kilometers. A metro cell is a cell in a wireless communications system that provides radio coverage served by a low power cellular access point (or base station) and, therefore has a smaller coverage area than a macro cell. A femto cell is a small, low power cellular access point that can be used in a home or small business, for example. A femto cell is a subset of a type of cell referred to as small cells, which are low-powered radio access nodes that operate in licensed spectrum and unlicensed spectrum and have a range of 10 meters to 1 or 2 kilometers, for example. A micro cell is a cell in a wireless communications system that is served by a low power access point and covers a limited area (e.g., a shopping mall, a hotel, and so on). A micro cell usually has a coverage area that is larger than the coverage area served by a pico cell. A pico cell is a small access point that can cover a small area (e.g., a building) and is used to extend coverage of signals to indoor areas and/or to add network capacity in areas with dense wireless communications usage.

Wireless communications environment 100 includes one or more macro cells 102, 104 and one or more other types of cells, such as one or more small cells 106, 108 deployed within the wireless communications environment 100 and servicing one or more user equipment devices 110, 112, 114, 116, 118. Each wireless communications network (e.g., macro cells 102, 104 and small cells 106, 108) comprises one or more network devices (e.g., a set of network devices) that operate in conjunction in order to process network traffic for the one or more user equipment devices 110, 112, 114, 116, and 118. For example, macro cells 102, 104 can comprise a set of devices that are macro cell enabled devices or that are configured to communicate according to a macro cell radio access technology. In another example, the small cells 106, 108 can include a set of devices that are small cell enabled devices or that are configured to communicate according to a small cell radio access technology. It is noted that although these networks are described as macro cells 102, 104 and small cells 106, 108, the networks can be other types of cells (e.g., metro cells, femto cells, distributed antenna system (DAS), and so on). Therefore, any reference to a particular cell-type is used for purposes of discussion and not limitation according to the various aspects.

As illustrated, each of the one or more small cells 106, 108 has a corresponding service area 120, 122. Further, each of the one or more macro cells 102, 104 has a corresponding service area 124, 126. However, it should be understood that the wireless communications environment 100 is not limited to this implementation. Instead, any number of cells (e.g., macro cells, small cells, femto cells, and so on) and respective service areas can be deployed within the wireless communications environment 100. Further, the geographic areas or cell coverage areas can be any shape and can have any dimensions. Thus, the illustrated embodiments should be understood as being illustrative and should not be construed as being limiting in any way.

Further, although only five user equipment devices 110, 112, 114, 116, 118 are illustrated; any number of user devices can be deployed within the wireless communications environment 100. A user equipment device may contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. In addition, the user equipment devices 110, 112, 114, 116, 118 and/or the networks can include functionality as more fully described herein.

In an aspect, the macro cells 102, 104 and the small cells 106, 108 can monitor their surrounding radio conditions (e.g., by employing respective measurement components). For example, each of the macro cells 102, 104 and small cells 106, 108 can determine network traffic load on its respective network by performing a network diagnostic procedure. As an example, during a network listen procedure, macro cells 102, 104 and small cells 106, 108 can scan their radio environment to determine network performance statistics. Various parameters associated with macro cells 102, 104 and small cells 106, 108 can be detected during the network diagnostic procedure, such as, but not limited to, frequency bands, scrambling codes, common channel pilot power, bandwidth across respective networks, universal mobile telecommunications system terrestrial radio access receive signal strength indicator, and so on.

The user device (as well as other user devices) and/or the network (e.g., one or more base stations) might experience interference in a location due to overlapping coverage and/or due to other parameters (e.g., uplink interference, downlink interference, and so on). The interference can cause the possibility that a connection might be lost (e.g., dropped call) or that other negative impacts to the user experience could occur (e.g., disruption during the communication, slow response of data, and so on). Therefore, in accordance with the disclosed aspects, the interference experienced by each mobile device, as well as other metrics related to the mobile devices and/or each network, are monitored and various adjustments are made to one or more settings in order to mitigate the interference experienced by each mobile device and/or each network (e.g., each cell, each base station).

User equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network can be packet-based; however, radio and frequency/amplitude modulation networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice traffic, data traffic, and so on) between one or more components can include, wired communications (e.g., routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like). In accordance with some embodiments, one or more of the user equipment devices can be capable of simultaneous connection to the networks. For example, a user equipment device can be a multi-mode device.

A network can include a plurality of elements that host logic for performing tasks on the network. The logic can be hosted on servers, according to an aspect. In packet-based wide-area networks, servers may be placed at several logical points on the network. Servers may further be in communication with databases and can enable communication devices to access the contents of a database. Billing servers and application servers are examples of such servers. A server can include several network elements, including other servers, and can be logically situated anywhere on a service provider's network, such as the back-end of a cellular network. A server hosts or is in communication with a database hosting an account for a user of a mobile device. A "user account" includes several attributes for a particular user, including a unique identifier of the mobile device(s) owned by the user, relationships with other users, application usage, location, personal settings, business rules, bank accounts, and other information.

Figure 2:
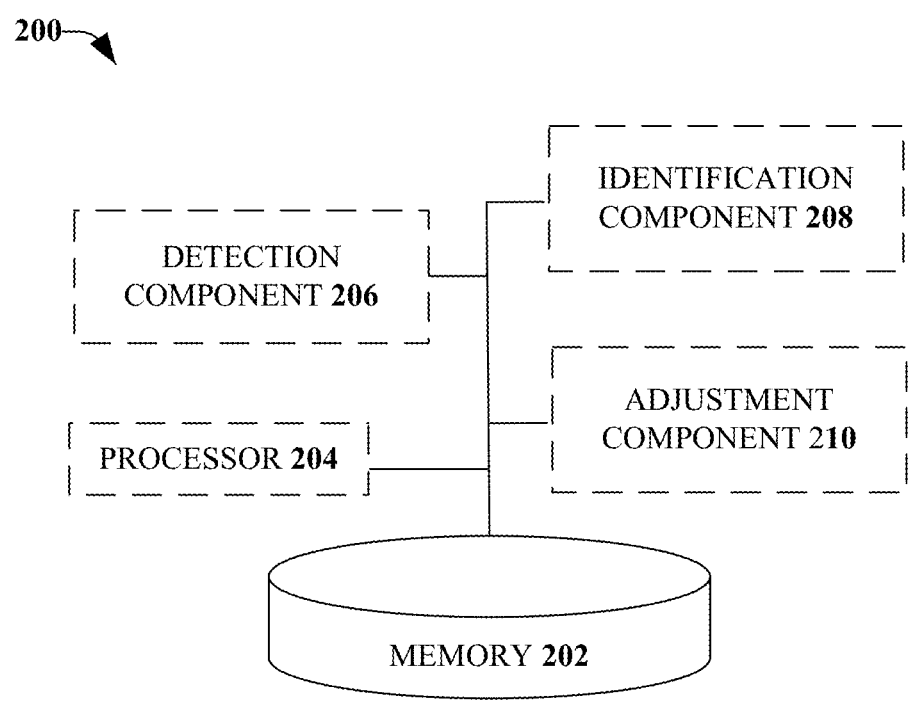
FIG. 2 illustrates an example, non-limiting system for self adaptive coverage of wireless networks, according to an aspect.

FIG. 2 illustrates an example, non-limiting system 200 for self adaptive coverage of wireless networks, according to an aspect. User demand for data has been increasing exponentially. One or more of the disclosed aspects relate to overcoming limitations in the spectrum availability in order to meet the increased user demand. For example, various aspects disclosed herein provide improvements to the spectral efficiency of each transmission either from the perspective of the base station, from the perspective of the user device, or from the perspectives of both the base station and the user device.

There are settings that are available in order for adjustments to be made to a static environment or for the entire network. These available adjustments merely provide "median" solution improvements over cells and only on a limited basis. Further, these median solutions do not provide improvements for variable time periods and for each cell. On the lowest level, the base station and user device can perform quick adaptations to improve spectral efficiency. However, observations in the field indicate that even these quick adaptations do not fully solve the challenges related to spectral efficiency. This can be due to the lack of the ability of such systems to observe certain key data that is available at higher layers or due to such systems not having a "big picture" in which to perform the needed improvements.

The disclosed aspects overcome the above by implementing improvements to both the uplink spectral efficiency and the downlink spectral efficiency. Therefore, the perceived user throughput for a given cell and/or time of day can be improved through the use of various metrics that observe cell performance throughout the day and allows for the adjustment of various settings in such a manner that cell performance can be changed quickly or in real-time, as degradation within the cells is being observed.

System 200 comprises at least one memory 202 (e.g., a memory device) that can store computer executable components and instructions. System 200 can also include at least one processor 204 (e.g., a processor device), communicatively coupled to the at least one memory 202. Coupling can include various communications including, but not limited to, direct communications, indirect communications, wired communications, and/or wireless communications. The at least one processor 204 can execute or facilitate execution of the computer executable components stored in the at least one memory 202. The at least one processor 204 can be directly involved in the execution of the computer executable component(s), according to an aspect. Additionally or alternatively, the at least one processor 204 can be indirectly involved in the execution of the computer executable component(s). For example, the at least one processor 204 can direct one or more components to perform the operations.

It is noted that although one or more computer executable components may be described herein and illustrated as components separate from the at least one memory 202 (e.g., operatively connected to memory), in accordance with various embodiments, the one or more computer executable components could be stored in the at least one memory 202. Further, while various components have been illustrated as separate components, it will be appreciated that multiple components can be implemented as a single component, or a single component can be implemented as multiple components, without departing from example embodiments.

System 200 also includes a detection component 206 that can be configured to monitor various conditions within a communications network. For example, the detection component 206 can be configured to monitor both uplink interference and downlink interference. In accordance with an implementation, the detection component 206 can be configured to monitor an interference experienced by a first set of devices of a first cell (e.g., macro cell 104 of FIG. 1). For example, the interference experienced by the first set of devices can be caused by a first mobile device (e.g., user equipment device 118 of FIG. 1) in communication with a second set of devices of a second cell site (e.g., small cell 108 of FIG. 1). Further, the detection component 206 can be configured to monitor an interference experienced by a second mobile device (e.g., user equipment device 114 of FIG. 1) in communication with the first set of devices. The interference to the second mobile device can be caused by the second set of devices (e.g., small cell 108).

It is noted that the interference experienced by the first set of devices and/or the second mobile device might also be caused by subsequent devices of subsequent networks (e.g., macro cell 102 of FIG. 1), such that three or more networks are contributing to the inter-cell interference. Further, other mobile devices (e.g., user equipment device 112 of FIG. 1) might also contribute the interference experienced by the first set of devices and/or the second mobile device. In addition, other devices (e.g., the second set of devices, subsequent sets of devices) and other mobile devices (e.g., other user equipment) can experience interference. According to an aspect, all the uplink interference and downlink interference experienced by all mobile devices and set of network devices is included when calculating a total interference experienced in the network.

An identification component 208 can be configured to determine the radio access technology utilized by the devices in each network. For example, the identification component 208 can be configured to determine a first radio access technology utilized by the first set of devices to communicate and a second radio access technology utilized by the second set of devices to communicate. For example, the radio access technology utilized by the sets of devices can be a macro cell radio access technology, a small cell radio access technology, or another type of radio access technology (e.g., femto cell, pico cell, metro cell, and so on). For example, each set of devices can be configured to communicate according to a micro cell radio access technology, a macro cell radio access technology, or other types of radio access technologies. It is noted that as described herein, reference might be made to a macro cell, a small cell, a micro cell, a distributed radio access cell, and so on. Further, the identification component 208 can be configured to determine subsequent radio access technologies utilized by the subsequent devices to communicate.

As a result of the radio access technology determined by the identification component 208, an adjustment component 210 can be configured to modify at least one setting in order to reduce the interference. The adjustment component 210 can also take into account the time of day when making the modification. The setting modified by the adjustment component 210 can be based on a consideration of the type of radio access technology utilized by each set of network devices. The adjustment component 210 can also consider the current settings when making the decision to apply the modifications to the one or more settings. Such settings can include, but are not limited to, one or more of reducing a transmission power, changing aiming, tilt, and/or position of an antenna, balancing uplink and downlink path losses, and so on. Further, the adjustment component 210 can facilitate the implementation of changes to various settings that, previously, might have been held constant.

Figure 3:
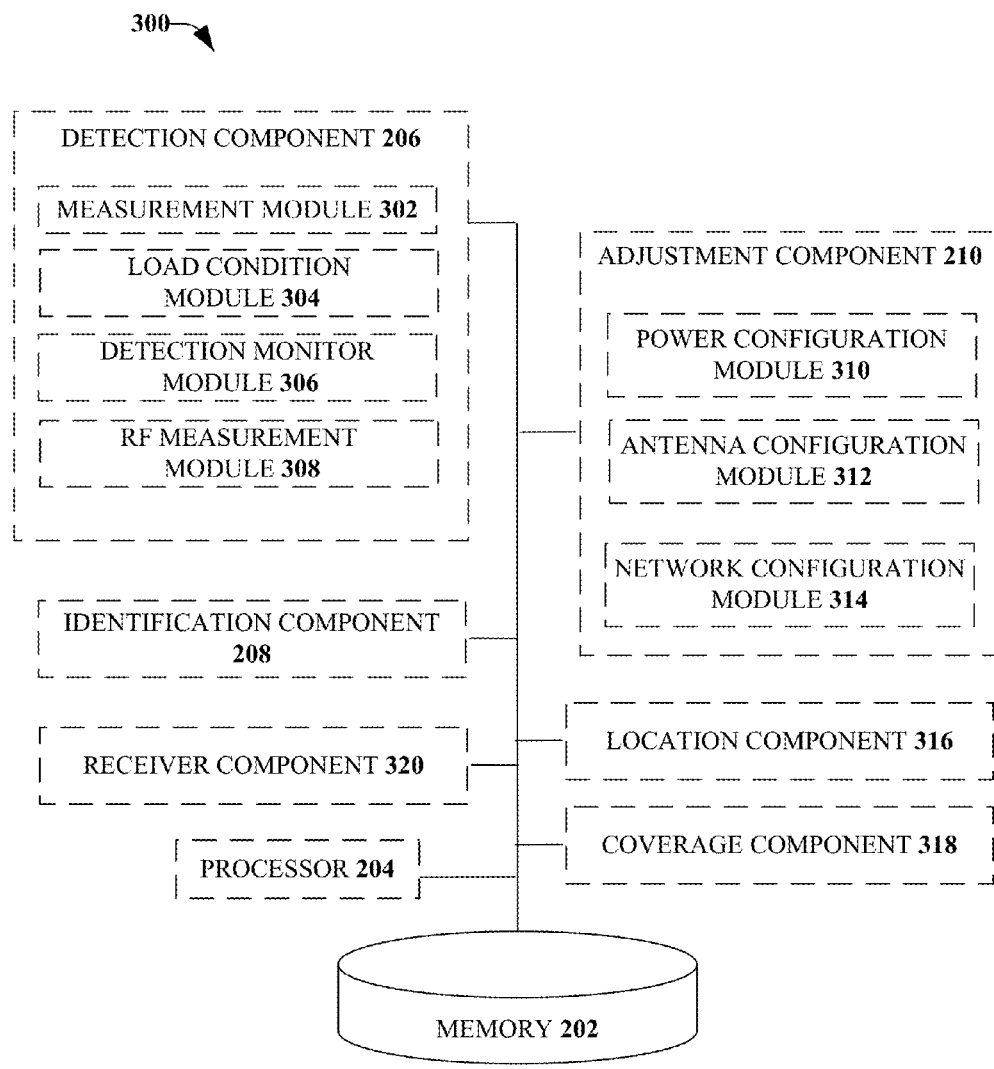
FIG. 3 illustrates and example, non-limiting system for reducing interference within a communications network, according to an aspect.

FIG. 3 illustrates an example, non-limiting system 300 for reducing interference within a communications network, according to an aspect. A detection component 206 is configured to detect an uplink interference and a downlink interference. According to some aspects, the interference experienced by other mobile devices and/or network devices is included in the calculation of the interference.

According to an aspect, uplink inter-cell interference and/or intra-cell interference can be detected. A measurement module 302 can be configured to measure a total received uplink interference power. The total received uplink interference power can be measured in different frequencies, which can be the frequencies of interest. For example, based on historical information it can be determined that a certain frequency, or range of frequencies, might experience a high amount of interference at a particular time of day and/or day of the week. In this case, only that frequency, or that range of frequencies might be analyzed and can be considered the frequency of interest.

A load condition module 304 can be configured to determine respective network traffic loads of the first set of devices and the second set of devices. A detection monitor module 306 can be configured to determine a quantity (or number) of other sets of devices (e.g., base stations) of other cell sites that the first mobile device and second mobile device are able to detect (e.g., active set and detected set neighbors). A radio frequency (RF) measurement module 308 can be configured to receive a third set of radio frequency measurements from the other sets of devices (e.g., base stations) and a fourth set of radio frequency measurements from the other mobile devices connected to the other sets of devices.

In accordance with some aspects, based on the identified radio access technology utilized by the respective network, or based on other considerations, the adjustment component 210 can be configured to selectively implement an interference mitigation procedure. For example, a first procedure can be implemented for small cells and a second procedure can be implemented for large cells. According to another implementation, for a small cell, the interference can be mitigated by reducing a transmission power of the cell. According to another implementation, for a large cell, the interference can be mitigated by reducing a transmission power at the cell and/or changing a configuration of an antenna at the cell. However, the disclosed aspects are not so limited and an antenna of the small cell can be adjusted, according to some implementations. Further, according to some aspects, the transmission power can be increased in order to help ensure that coverage holes are not formed while mitigating interference within the communications network.

A power configuration module 310 can be configured to adjust the transmission power of the cell in small steps. For example, the transmission power of the cell can be adjusted by an adjustment unit per iteration for a defined number of iterations. For example, the power configuration module 310 can be configured to reduce the transmission power by an adjustment unit (e.g., a reduction unit) per iteration for a defined number of iterations. In another example, the power configuration module 310 can be configured to increase a transmission power by an adjustment unit (e.g., an expansion unit) per iteration for a defined number of iterations.

According to an implementation, the adjustment unit for adjusting the transmission power can be adjusted by various dB power levels, which can be considered small power adjustments (e.g., 0.25 dB power adjustment, 0.5 dB power adjustment, 0.75 dB power adjustment, 1 dB power adjustment, and so forth). In such a manner, the power adjustment can be implemented in small steps or small increments in order to maximize the effect of the power adjustment. If the power adjustment is too much, it may overshoot the optimal setting and have a negative impact on the network traffic, which might be avoided through the utilization of smaller adjustment increments. Similar (or different) units can be utilized to decrease and/or increase the transmission power in small steps.

For example, to adjust the transmission power, the adjustment component 210 can be configured to send a signal to the base station (e.g., a device of a set of devices of the network) instructing the base station to lower (or increase) its transmit power. Alternatively, a signal can be sent to the device to lower or raise its power based on uplink coverage KPIs, such as uplink noise rise over thermal.

An antenna configuration module 312 can be configured to down-tilt, up-tilt, or move an antenna azimuthally by another adjustment unit for a defined number of iterations. According to some aspects, changing the configuration of the antenna can include changing an azimuth and/or an ascension of the antenna. In an example, to change the positioning of an antenna, the antenna configuration module 312 can send a signal that includes an instruction to change an orientation of the antenna by a certain degree or by another value. A motor or other device can be configured to move the antenna as instructed. In such a manner, adjustments can be dynamically applied throughout the network, which can improve the user experience, increase spectral efficiency, as well as provide other benefits within a communications environment.

In accordance with some implementations, the adjustment unit for the down-tilt, up-tilt, and so forth, of the antenna can be expressed as degrees (e.g., 0.5 down-tilt, 1.0 down-tilt, and so on). Similar to the power adjustment, the configuration change of the antenna is performed in small increments. Further, the number of iterations can be a function of network performance after each iteration.

According to some aspects, both the transmission power and the orientation of the antenna are adjusted. Further to this aspect, the number of times (e.g., iterations) that the transmission power is adjusted can be same, or different than, the number of times that the antenna is adjusted. According to another implementation, for a small cell, the interference can be mitigated by the power configuration module 310 reducing the transmission power at the small cell by a reduction unit per iteration for a defined number of iterations. In a further implementation, for a large cell, the antenna might be at a down-tilt limit. In this case, the antenna configuration module 312 does not down-tilt the antenna, however, the power configuration module 310 can continue to reduce the transmission power by the reduction unit. Additionally, if an antenna of the small cell can be adjusted, the antenna configuration module 312 can be configured to down-tilt the antenna of the small cell by a reduction unit per iteration, according to an aspect. According to some aspects, only the respective configuration of the antenna is adjusted (e.g., the transmission power is not changed).

Additionally or alternatively, for a UMTS implementation, a network configuration module 314 can be configured to adjust a network contribution parameter and add the small cell to the active set of the mobile device. The active set for the mobile device is the set of active cells that can power control the mobile device. For example, adding the cell to the active set of the mobile device can include adding an identification of the cell to a data structure comprising the respective identifications of the cells in communication with the mobile device.

As it relates to 3G networks, there is a concept referred to as "active set" where multiple cells can cooperate and jointly control the power transferred by the cell and the power transferred by the mobile devices. The active set of the mobile device are the identifications of the base stations with which the mobile device is simultaneously connected. If some of the neighbors that are not currently in the active set can be placed into the active set (e.g., included as an active set member) of a particular mobile device, the power at which the mobile device is transmitting can be better controlled. Further, if the cell is in the active set, the power at which the cell is transmitting can be better controlled. This can further help to reduce interference in the context of 3G networks.

Further, the number of iterations can be defined based on monitoring the network performance after each iteration. For example, a location component 316 can be configured to determine locations for the first mobile device and the second mobile device. The locations can be determined after each iteration, for example. A coverage component 318 can be configured to determine that at least a subset of locations, determined by the location component 316, are within a network traffic coverage area of the first set of devices. The coverage component 318 can also be configured to determine that another subset of the locations, determined by the location component 316, are within another network coverage area of the second set of devices. The determinations by the coverage component 318 can be performed after each iteration and are performed to determine if any coverage holes are present in the communications network after one or more settings have been adjusted.

The adjustments made can result in one or more adjusted settings. After an iteration, it might be determined, by the detection component 206 that a performance indicator has degraded below a threshold value. If so, the adjusted setting can be reverted to a prior setting. If the degradation is severe, the settings can be revered to original settings.

According to some implementations, a receiver component 320 can be configured to receive a first propagation delay and a first radio frequency measurement from the first mobile device. The receiver component 320 can also receive a second propagation delay and a second radio frequency measurement from the second mobile device. Further, the receiver component 320 can be configured to receive a first set of radio frequency measurements from the first set of devices and a second set of radio frequency measurements from the second set of devices. Further to this implementation, the location component 316 can be configured to determine a first position of the first mobile device and a second position of the second mobile device based on the information obtained by the receiver component 320. The position of the mobile devices to be utilized to determine if there are any coverage holes (and to eliminate the coverage holes if necessary). According to some aspects, the locations are utilized for historical purposes and the locations can be mapped to a time of day/day of week for dynamic mitigation of interference.

Figure 4:
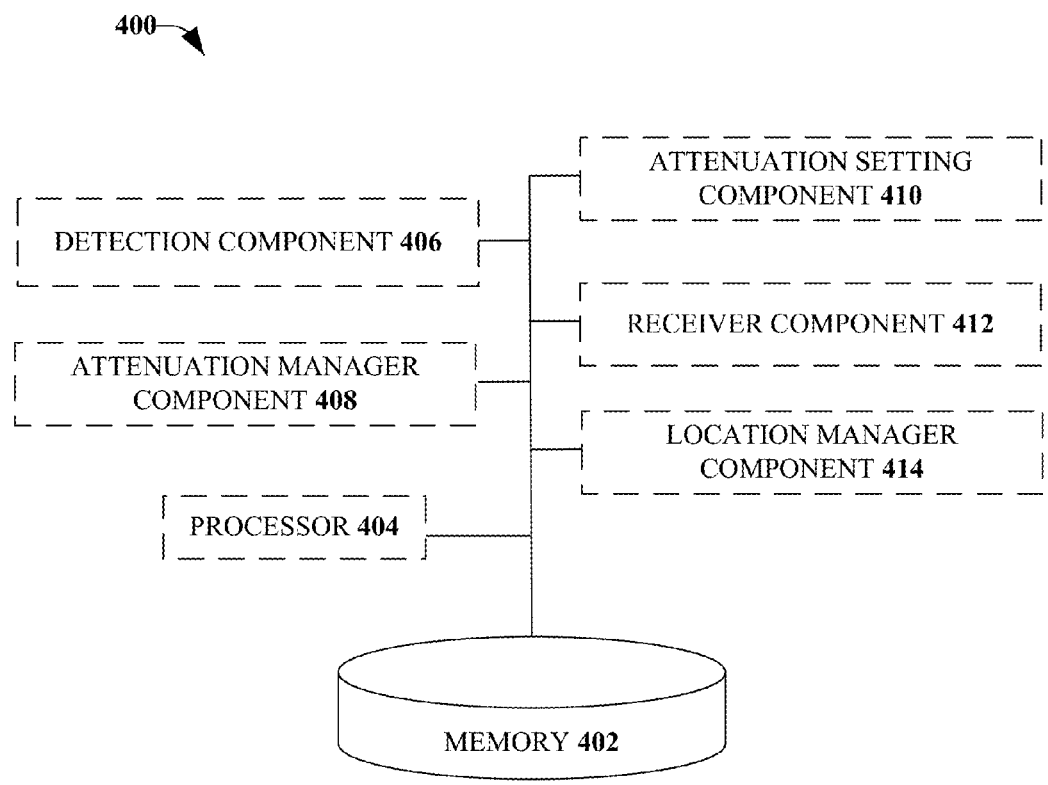
FIG. 4 illustrates an example, non-limiting system for interference detection and mitigation, according to an aspect.

FIG. 4 illustrates an example, non-limiting system 400 for interference detection and mitigation, according to an aspect. An approach discussed herein relates to balancing the load for all sector faces, including co-located sectors of other NodeBs. For example, certain sites might have multiple sector carriers facing the same area. The disclosed aspects are configured to make sure the load in the carrier is balanced among all these cells. At times, it has been observed that the load might be balanced only among cells that are active on the same site. There have been also been scenarios where multiple sites are in the same location and covering the same area. When there are multiple sites in the same location, the load should be balanced among the different sites, rather than just balanced among carriers that belong the same site. Thus, the balancing can be performed for the network traffic load for sector carries belonging to same sites, as well among sectors carriers belonging to different sites if they are co-located.

Further, excessive cell overlap can be reduced in order to eliminate or mitigate excessive neighboring cells that have overlapping coverage in the coverage of the serving cell. If too many cells overlap and the overlap is large, it can affect the overall throughput and system capacity. Therefore, one or more of the disclosed aspects are configured to reduce cell overlap (and maintain uplink and downlink coverage balance) so that an excessive number of cells are not overlapping on the current cell and/or if there is overlap, that the overlap is not too large.

Further, there can be a number of metrics analyzed, including throughput and call drops. Based on the interference measurements and subsequent adjustment of configuration parameters, the metrics can be maximized (subject to constraints) by maintaining coverage will not degrade one or more identified performance indicators.

Various metrics can be utilized for balancing the load including, and such metrics are not limited to key success metrics (or key success indicators), which can include throughput, number of connections, payload carried, setup rejection level, physical resource block utilization (PRB), transition time interval (TTI) utilization, and so on. Another metric can include identified objective metrics, which can include interference measurements as well as other measurements. Further, various settings can be adjusted, which can include configuration parameters as well as other settings.

System 400 can include at least one memory 402 and at least one processor 404. The memory 402 stores executable instructions that, when executed by the processor 404, facilitates performance of operations Also included in system 400 is a detection component 406 that can be configured to detect an imbalance in an uplink path loss and a downlink path loss of a mobile device connected to a set of devices of a cell site.

For a distributed antenna system implementation, for example, the system 400 should determine whether the uplink and downlink attenuations are correctly specified. In order to do this, verification should be made to ensure that the distributed antenna system antenna attenuation and gain settings have been specified correctly. It has been observed that in some distributed antenna systems, these settings have not been specified correctly.

An attenuation manager component 408 can be configured to verify the downlink attenuation and the uplink attenuation. The downlink and uplink attenuations can affect the power transmitted by an antenna and also the power received by the mobile devices or the base station and need to be accurate. In many instances, the settings are not known precisely or might not be set accurately by vendors, and so on. By correcting the settings, if needed, the interference level at both the mobile device and the base station can be more accurately estimated and corrected.

The attenuation manager component 408 can be configured to implement a distributed antenna system attenuation verification algorithm to determine the attenuation automatically, which allows for modifications to be dynamically implemented in order to correct the attenuation settings in real-time. An attenuation setting component 410 can be configured to adjust the attenuations correctly in order for the interference to be accurately calculated (e.g., by the detection component 406) at both the mobile device and the base station. For example, the attenuation setting component 410 can be configured to adjust uplink and downlink attenuation settings at the set of devices.

According to an implementation, variables that are initially unknown to the attenuation manager component 408 comprise the uplink attenuation, the downlink attenuation, and the path loss. To calculate these variables, a receiver component 412 can be configured to collect radio frequency (RF) traces. For example, the receiver component 412 can be configured to receive a set of radio frequency measurements from the mobile device and the set of devices at defined intervals.

The RF traces can include a received signal strength and/or quality at the mobile device, received power at the base station, a mobile device transmit power, a base station transmit power, and so on. The RF traces can be collected for communications (sometimes referred to as calls) that have a fixed rate. For example, voice calls have a fixed rate of 5.9 kilo bits per second or 12.2 kilo bits per second. According to some aspects, the RF traces can include the base station (e.g., (e)NodeB) transmit (RS)CPICH (common pilot channel) power, for an UMTS implementation, which can be received from configuration files. Another RF trace can include a reference signal received power (RSRP), a reference signal code power (RSCP), and/or received total wideband power (RTWP) from real-time performance monitoring, cell traffic recording, or other types of monitoring.

Based on the RF traces, the attenuation manager component 408 can be configured to compute a path loss predicted to be experienced on the downlink. The downlink path loss represents the path loss from the base station to the mobile device. The attenuation manager component 408 can calculate the downlink path loss as the base station transmit power, minus the downlink attenuation, minus the received signal strength at the mobile device, which can be expressed as:

$$PL_{DL}=TxPwr_{BS}-Atten_{DL}-RcvSignalStrength_{UE}$$

where $PL_{DL}$ is the downlink (DL) path loss; $TxPwr_{BS}$ is the transmit power at the base station; $Atten_{DL}$ is the downlink attenuation; and $RcvSignalStrength_{UE}$ is the received signal strength at the mobile device (or user equipment (UE)).

The attenuation manager component 408 can also be configured to calculate or predict the path loss on the uplink. The uplink path loss can be calculated by the attenuation manager component 408 as the power at which the mobile device transmits, minus the uplink attenuation at the base station, minus the received signal strength at the base station, which can be expressed as:

$$PL_{UL}=TxPwr_{UE}-Atten_{UL}-RcvSignalStrength_{BS}$$

where $PL_{UL}$ is the uplink (UL) path loss; $TxPwr_{UE}$ is the transmit power of the mobile device; $Atten_{UL}$ is the uplink attenuation; and $RcvSignalStrength_{BS}$ is the received signal strength at the base station.

After both the uplink path loss and the downlink path loss have been calculated, the respective path losses are compared and a determination is made whether the path losses are about the same or are approximately equal (e.g., is $PathLoss_{DL} \approx PathLoss_{UL}$). If there is a deviation between the two values that is more than a threshold path loss value, it indicates there might be one or more parameters that are incorrect. The threshold can be selected based on various criteria. For example, the threshold can be selected based on typical (and/or acceptable) variance within the network based on historical measurements. Therefore, the threshold can be selected to be an expected variance between the uplink and downlink path losses.

In the majority of cases, the incorrect parameter is that the uplink attenuation is specified incorrectly, the downlink attenuation is specified incorrectly, or both the uplink attenuation and the downlink attenuation are specified incorrectly. In other instances, the path losses might be known (or discovered) through the use of "probes" that transmit and receive on a periodic basis (or on another basis, such as an irregular basis, for example) from fixed and known locations and then the attenuations can be solved for directly from the above measurements.

Thus, if the difference between the uplink and downlink attenuation are less than the threshold path loss value, the settings are considered accurate and no further action is taken. However, if the difference is greater than the threshold path loss value, the attenuation setting component 410 can adjust either or both of the attenuations, based on the known information, so that the difference between the uplink attenuation and the downlink attenuation are less than the threshold path loss value. The attenuation setting can be adjusted, as needed, as an initial step of determining how much interference is expected to be received at the mobile device and/or base station.

According to some implementations, the downlink path loss and the uplink path loss can be calculated. Information that can be obtained to perform the path loss calculations can be received from measurements, which include the transmit common pilot channel (TX CPICH), RSCP, mobile device transmit power (which might be filtered for speech only), and RTWP.

The RSCP (or downlink path loss) can be calculated as the transmit CPICH (as measured at the cabinet, minus the downlink attenuation, minus the path loss, which can be expressed as:

RSCP=TX CPICH (cabinet)−DL atten.−PL

Further, the RTWP (for a single user) or an uplink path loss can be calculated as the mobile device transmit power, minus the uplink attenuation, minus the path loss, which can be expressed as:

RTWP (single user)=UE Tx pwr−UL atten.−PL

As discussed above, the calculation includes solving for a value that represents the downlink attenuation minus the uplink attenuation. The difference can be compared to known entered quantities. If the derived value is more than a threshold path loss value, the attenuation setting component 410 can make one or more adjustments. For a short term correction, according to an implementation, manual measurements with known path loss can be conducted during a maintenance interval (no other users).

It is noted that the above procedure(s) can be utilized for various wireless communications technologies. For example, in a 4G/LTE implementation, the measurements can be utilized by a substitution of a reference signal received power (RSRP) for RSCP and noise floor per physical resource block (PRB) for RTWP. Further, other wireless communications technologies can utilize other nomenclature and the disclosed aspects are not limited by a particular named measurement. Instead, any similar and/or equivalent measurement can be utilized.

According to some implementations, system 400 can include a location manager component 414 that can be configured to determine the location of the mobile device under consideration. The positioning (or location) of the mobile device under consideration helps to understand the RF conditions experienced by mobile devices at specific locations. The position information can also be useful for service coverage determinations and/or interference mitigation. Another benefit of knowing the position of a mobile device is to determine if the interference at specific locations in the network can be ascertained and dynamically corrected. The RF traces and other propagation delay data obtained from the mobile device can be utilized by the location manager component 414 to ascertain where the mobile device is located. The location of the mobile device can be utilized to determine if interference problems occur at various locations in the network and, if so, to focus on those areas to help insure that coverage is not lost and/or to reduce interference at those areas. The position can be also be retained (e.g., in a database) as historical information.

If available, the propagation delay and/or timing advance information can be used to estimate the distance of the mobile device from two or more distinct base stations. This can result in two possible mobile device locations if there are only two distinct base stations.

If the mobile device can obtain RF measurements from three or more distinct base stations, the location manager component 414 can utilize the measurements to more accurately determine the position of the mobile device. Further, the location manager component 414 can use the received signal strength from at least the third base station and use a maximum likelihood estimation to refine the mobile device location to ascertain whether, out of two possible locations, which location is the more likely location of the mobile device.

Figure 5:
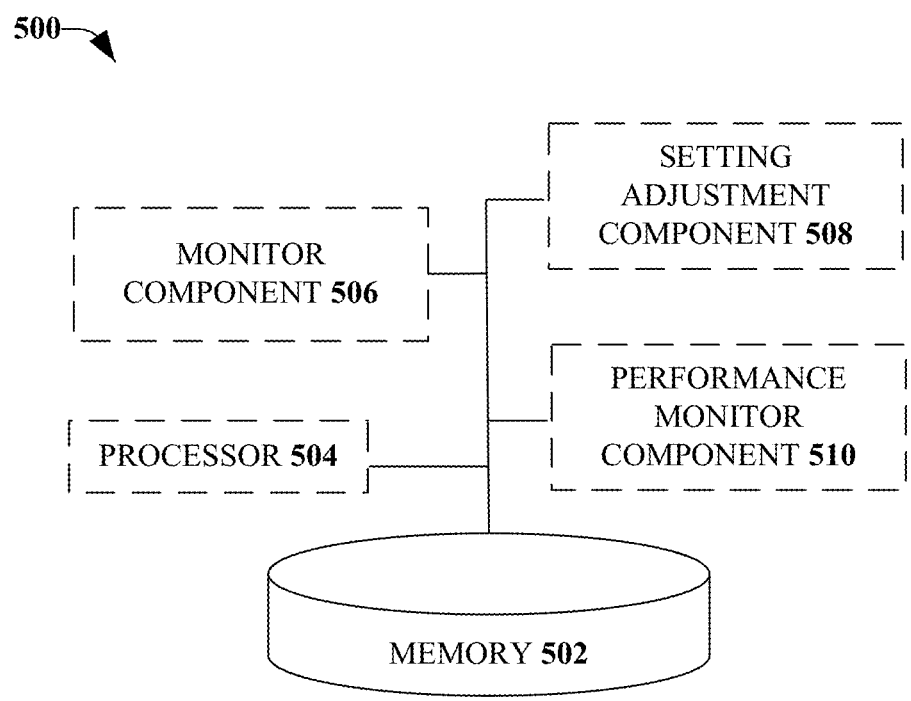
FIG. 5 illustrates an example, non-limiting system for improving spectral efficiency in a communications network, according to an aspect.

FIG. 5 illustrates an example, non-limiting system 500 for improving spectral efficiency in a communications network, according to an aspect. System 500 can include at least one memory 502 and at least one processor 504. The memory 502 stores executable instructions that, when executed by the processor 504, facilitates performance of operations. Also included in system 500 is a monitor component 506 that is configured to monitor a spectral efficiency indicator that indicates spectral efficiency experienced by a set of mobile devices connected to a set of devices of a cell site.

According to an aspect, the monitor component 506 is configured to receive a set of radio frequency measurements from the set of devices and from another mobile device connected to the set of devices. Further, the monitor component 506 is configured to determine a block error rate value, a resource utilization, and a throughput value. Further, the monitor component 506 can be configured to determine a multiple-input multiple-output utilization factor at the other mobile device and at the set of devices.

A setting adjustment component 508 is configured to adjust a setting to increase the spectral efficiency as a function of the monitoring and a temporal indicator. The temporal indicator can relate to a time of day, a day of week, or another manner of indicating when something is occurring. A performance monitor component 510 is configured to monitor a performance indicator after the adjustment is made by the setting adjustment component 508.

According to some aspects, the setting adjustment component 508 is configured to modify a mapping between a channel quality index and a modulation and coding protocol based on the monitoring the performance indicator. In another aspect, the setting adjustment component 508 is configured to modify a block error rate target based on monitoring the performance indicator. Further, the setting adjustment component 508 can be configured to modify a mapping between a signal to noise plus interference ratio and a channel quality index based on the monitoring the performance indicator. In accordance with another aspect, the setting adjustment component 508 can be configured to modify averaging measurement periods and/or adjusting reporting periods of the channel quality index and/or adjusting SINR update periods and/or the modulation/coding scheme. In yet another aspect, the setting adjustment component 508 can be configured to modify a signal to noise plus interference ratio threshold value for a multiple-input-multiple output utilization.

According to some aspects, system 500 can be configured to determine a cell category and a radio frequency category for the set of devices based on a set of radio frequency measurements from the set of mobile devices and the set of devices. Additionally or alternatively, system 500 can be configured to adjust a downlink scheduler parameter based on a reference signal received power, a reference signal code power, and a channel quality index statistics for the set of devices and a radio frequency category. Another aspect might include adjusting the scheduler policies, such as round robin or proportional fair, depending on the spectral efficiency goal and block error rate (BLER).

Figure 6:
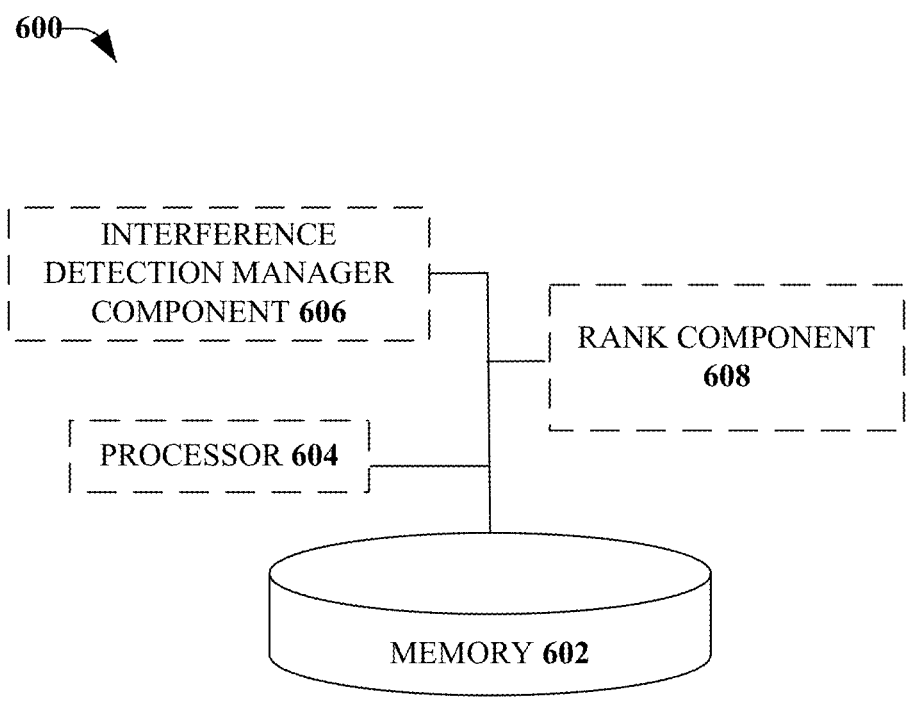
FIG. 6 illustrates an example, non-limiting system for uplink inter-cell interference detection, according to an aspect.

FIG. 6 illustrates an example, non-limiting system 600 for uplink inter-cell interference detection, according to an aspect. Once attenuation settings are verified and, if needed, corrected, as discussed above, the base stations that are affected by inter-cell interference can be identified. Further, the source(s) of the interference can be determined System 600 can include at least one memory 602 and at least one processor 604. The memory 602 stores executable instructions that, when executed by the processor 604, facilitates performance of operations Also included in system 600 is an interference detection manager component 606 that can be configured to determine whether the interference is caused by inter-cell interference, which should be mitigated. The interference detection manager component 606 can be configured to compute the total received power and uplink load at the base station. Next, the interference detection manager component 606 determines whether the total received power minus the uplink load (first value) is more than a threshold value. If the cell is functioning well, the total received power and the uplink load are about the same (e.g., less than the threshold value).

The interference detection manager component 606 also determines if the percentage of high negative signal-to-interference ratio (SIR) error (second value) is more than another threshold value. In one example, a high negative SIR error can be, for example, 10 dB. However, the disclosed aspects are not so limited and other values can be utilized for the threshold value. If both the first value and the second value are not more than the respective threshold values, there is no inter-cell interference. A high negative SIR error needs to be considered because the load at the base station is the only cause for received power at the base station, but is not the cause for any extra power at the base station.

If however, both the first value and the second value are at or above the respective threshold values, there is inter-cell interference. In this case, the interference detection manager component 606 can time-correlate the total received power at the base station versus the percentage of mobile devices that detect more than a certain number of neighbors. If the correlation coefficient is not more than a threshold coefficient, the interference is not related to inter-cell interference.

If however, the correlation coefficient is more than the threshold coefficient, it indicates that inter-cell interference is present. For example, the mobile devices can be analyzed to determine if a respective mobile device is able to power up sufficiently in order to achieve a certain quality. If the mobile device is not able to power up sufficiently, it can be a result of the negative SIR value. For example, if there is a high percentage of negative SIR, it is likely that the received power at the base station is very high and the mobile device cannot power up enough to overcome the noise at the base station. If the total received power observed at the base station is high, the total received power at the base station is time-correlated to determine if the received power correlates with the number of neighbors that the mobile device observes.

A rank component 608 can be configured to rank (or place in an order, such as an ascending order or a descending order) the neighbors based on their interference contribution and the percentage of handovers to each neighbor. The interference contribution can be calculated based on a distribution of the RF condition of each neighbor (e.g., RSCP in UMTS, RSRP in LTE, and so on) as compared to the RF condition of the serving base station and at all the mobile devices. For example, the interference contribution can be based on the average RF condition from a neighbor, variance of the RF condition from a neighbor, and the probability of having a certain RF condition from a neighbor.

Next, the rank component 608 (or another system 600 component) can select the top neighbors that contribute to the interference and the system 600 can attempt to mitigate the interference from these top ranked neighbors, according to the aspects discussed herein.

Figure 7:
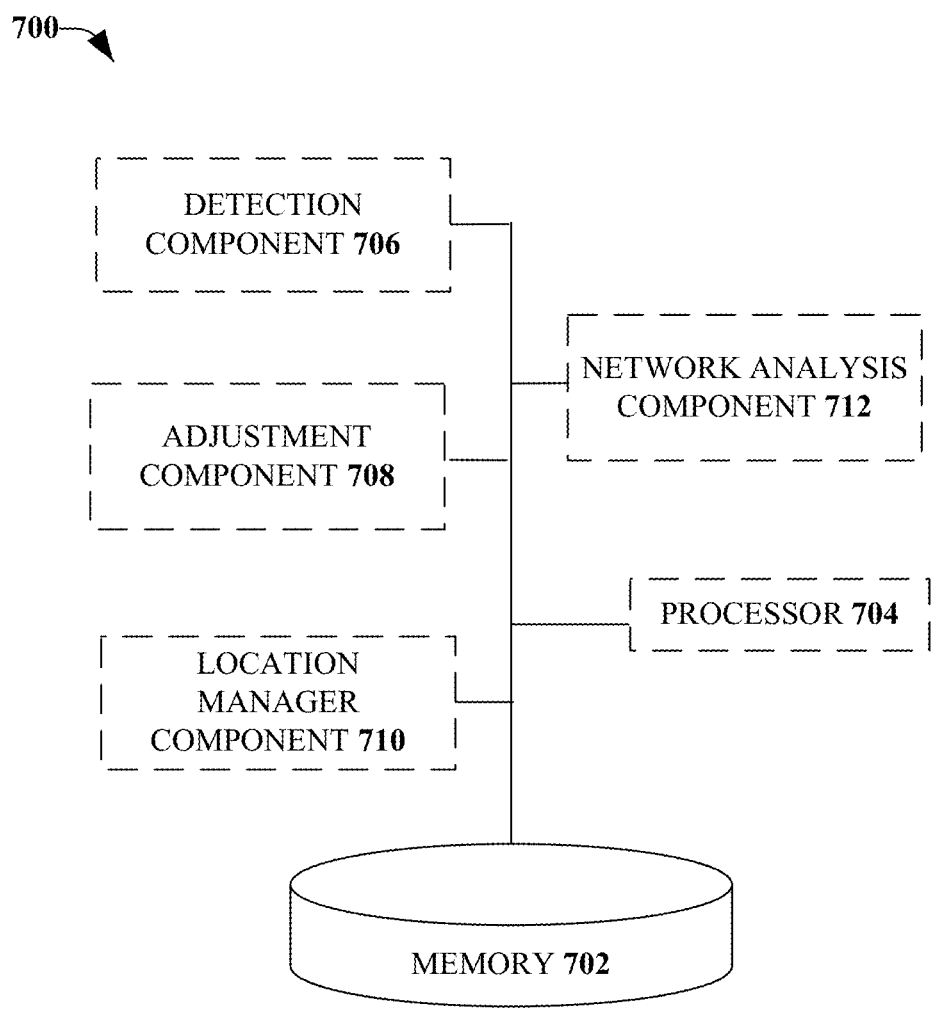
FIG. 7 illustrates an example, non-limiting system configured for inter-cell interference mitigation, according to an aspect.

FIG. 7 illustrates an example, non-limiting system 700 configured for inter-cell interference mitigation, according to an aspect. As discussed above, some algorithms balance the load among sectors belonging to the same NodeB/eNodeB. However, the load balancing should also be performed among co-located sectors belonging to different NodeB/eNodeBs. For example, cell reselection parameters (e.g., qRxLevMin, qQualmin) can be adjusted in order to equalize downlink power utilization, downlink code utilization, uplink load across co-located sectors, and so on. Therefore, before implementing inter-cell interference mitigation, the load should also be balanced across co-located sectors, as discussed herein.

System includes at least one memory 702 and at least one processor 704. If inter-cell interference has been detected, as determined by a detection component 706, an adjustment component 708 can implement an interference mitigation procedure, according to an aspect.

A location manager component 710 can apply a positioning algorithm and determine the location of one or more mobile devices. This location information can be utilized by a network analysis component 712, which can be configured to predict the updated network coverage and to ascertain that there are no coverage holes in the network. The updated network coverage can be predicted based on the RF traces, according to an aspect.

If the changes are not expected to negatively affect the network, the network analysis component 712 can instruct the adjustment component 708 (or another system component) to implement the changes. The network analysis component 712 and/or detection component 706 can continue to monitor the network, for at least a certain time period, to detect inter-cell interference.

The network analysis component 712 and/or detection component 706 can analyze the network to determine if one or more identified performance indicators have degraded. If no degradation is found, a determination is made whether there is any inter-cell interference detected. If no inter-cell interference is detected, no further action is taken. If however, inter-cell interference is detected, the adjustment component 708 can make one or more setting adjustments, as discussed herein.

If the determination by the network analysis component 712 and/or detection component 706 was that one or more identified performance indicators had degraded, it can indicate that a most recent change has a negative impact on the network. In this case, changes that were implemented at the cells showing bad coverage reports (e.g., Event A1) can be reverted. For example, a power configuration module can be configured to increase a transmission power of the respective cell by an expansion unit per iteration for a subset of a defined number of iterations. In another example, an antenna configuration module can be configured to up-tilt an antenna by an expansion unit per iteration for a subset of the defined number of iterations. In another example, both the power configuration module and the antenna configuration module can implement respective changes to reverse a most recent change to the network. Additionally or alternatively, changes implemented to cells with high uplink load can be reverted in a similar manner.

The network analysis component 712 and/or detection component 706 can check the identified performance indicators again. If none of the identified performance indicators are still degrading, a determination can be made whether inter-cell interference is detected. If not detected, no further action is needed. If inter-cell interference is detected, the adjustment component 708 can be configured to reverse one or more other previous settings.

If the determination was that the identified performance indicators are still degrading, all changes previously made can be reverted. In this case, new carriers may be required for overloaded cells. In some cases, the cells may need to be physically moved.

According to some implementations, the various aspects disclosed herein can utilize an artificial intelligence component (not shown), which can facilitate automating one or more features in accordance with the disclosed aspects. As discussed herein, the disclosed aspects can be utilized to mitigate inter-cell interference in a heterogeneous, self-optimizing communication network such that the user experience can be enhanced and the spectrum availability can be improved, as well as other aspects as compared to conventional systems. The disclosed aspects in connection with mitigation of interference and load balancing can employ various artificial intelligence-based schemes for carrying out various aspects thereof. For example, a process for receiving network congestion conditions and parameters and mobility parameters, comparing uplink and downlink attenuation, determining mobile device location, identifying the main contributors of interference, attenuation verification, interference detection, adaptive channel quality index to modulation coding scheme mapping, adaptive multiple-input-multiple-output improvements, adaptive downlink scheduler, and/or uplink power control improvements can be facilitated with an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine is an example of a classifier that can be employed. The support vector machine can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing usage of the user equipment device, by observing a movement pattern of the user equipment device, and so on). For example, support vector machines can be configured via a learning or training phase within a classifier constructor and feature selection module. Thus, the classifier(s) can be used to automatically learn and perform a number of functions, including but not limited to ascertaining whether inter-cell interference is present in the network, whether one or more parameters should be changed to mitigate the interference, whether the one or more parameter changes performed to mitigate the interference are acceptable or should be reversed, and so on. The criteria can include, but is not limited to, a type of network, location of the mobile device, a transmit power level of the cell, an orientation of an antenna of a cell, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, in local, cloud, and/or virtualized environment, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor and/or one or more network devices comprising at least one processor. Further, the methods can be implemented in one or more devices of a network and/or one or more devices located outside the network, but in communication with the network.

As usage of mobile communications networks, such as, but not limited to voice over long term evolution (LTE), increases, the proper balancing of the uplink and downlink coverage is necessary to avoid call drops. For example, as loading and concomitant interference grows, the uplink and downlink throughput should be improved in order to provide users with, for example, good web experience and/or video experience. Adaptive optimization of identified parameters related to the uplink and downlink throughput as a function of cell and/or time of day can allow timely enhancements and improvements to improve the user experience for each cell and even during busy (e.g., peak) hours.

Figure 8:
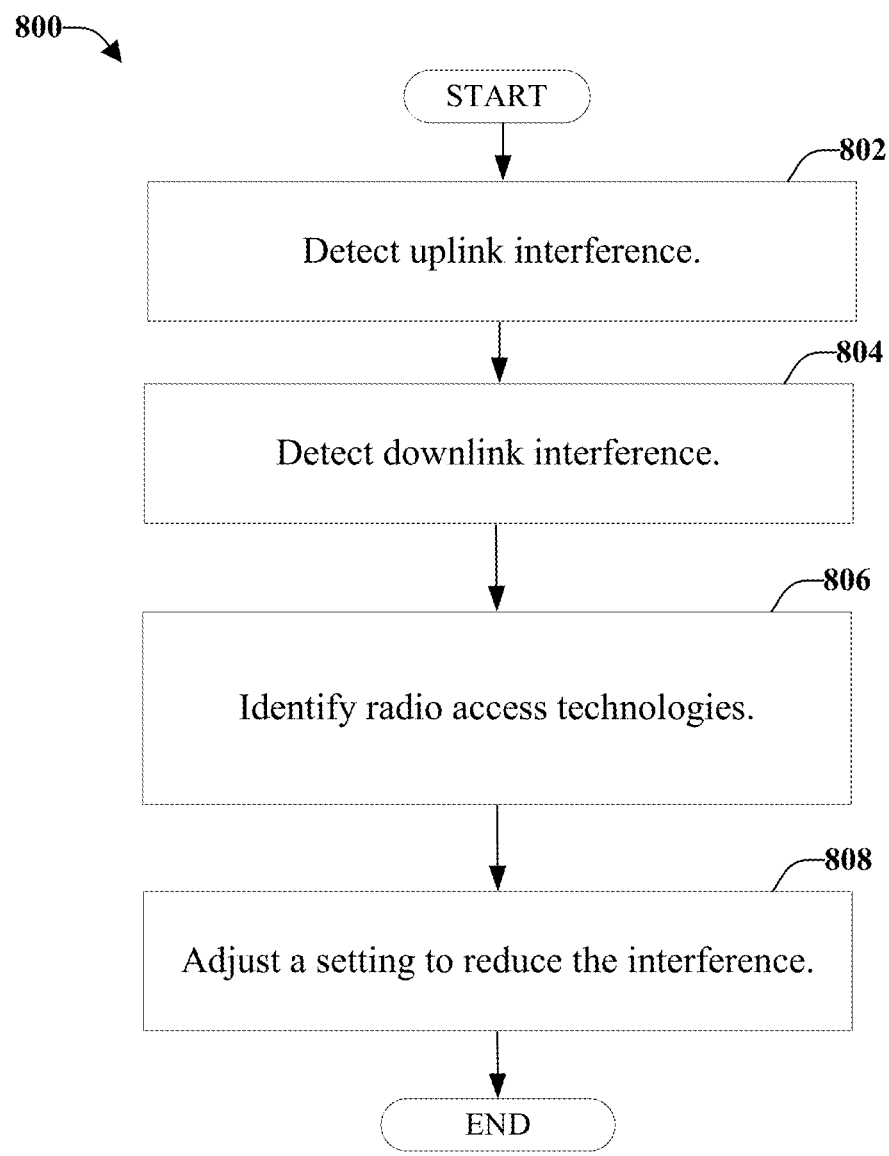
FIG. 8 illustrates an example, non-limiting method for reduction of a total amount of interference experienced in a wireless communications system, according to an aspect.

FIG. 8 illustrates an example, non-limiting method 800 for reduction of a total amount of interference experienced in a wireless communications system, according to an aspect. Method 800 starts, at 802, when an uplink interference level is detected. The uplink interference is the interference experienced by a first set of devices of a first cell site. The uplink interference is caused by a first mobile device in communication with a second set of devices of a second cell site. Further, the uplink interference can be caused by other mobile devices in communication with the second set of devices. Additionally, the uplink interference can be caused by mobile devices in communication with other sets of devices of other cell sites.

At 804, a downlink interference level is detected. The downlink interference is the interference experienced by a second mobile device in communication with the first set of devices and caused by the second set of devices. The uplink interference and the downlink interference can be detected based on or one more measurements or other information received from the first set of devices and the second mobile device, for example.

The respective radio access technologies of the first set of devices and the second set of devices are identified, at 806. For example, a first radio access technology utilized by the first set of device to communicate can be detected. Further, a second radio access technology utilized by the second set of devices to communicate can also be detected. Further, a third radio access technology utilized by a third set of devices, a fourth radio access technology utilized by the fourth set of devices, and so on, can be identified. In some implementations, the radio access technologies can be identified as a macro cell or a small cell, without further distinctions therebetween. For example, instead of distinguishing between a femto cell and a micro cell, both types of cells are simply classified as small cells.

In response to the identifying the radio access technologies, and a defined time of day, at 808, a setting is adjusting to reduce a composite interference. The composite interference comprises a combination of the interference experienced by the first set of devices and the second mobile device. According to an implementation, the composite interference comprises a total interference within the communications network.

According to some aspects, adjusting the setting at 808 comprises receiving a first propagation delay and a first radio frequency measurement from the first mobile device. Also, a second propagation delay and a second radio frequency measurement are received from the second mobile device. Further, to this aspect, a first set of radio frequency measurements is received from the first set of devices and a second set of radio frequency measurements are received from the second set of devices. Then, a first position of the first mobile device and a second position of the second mobile device are determined. The determination can be based on based on the first propagation delay, the second propagation delay, the first radio frequency measurement, the second radio frequency measurement, the first set of radio frequency measurements, and the second set of radio frequency measurements.

In accordance with an aspect, detecting the interference comprises measuring a total received uplink interference power in different frequencies. The respective network traffic loads of the first set of devices and the second set of devices can also be determined. Further, a quantity of other sets of devices of other cell sites that the first mobile device and the second mobile device are able to detect is determined. Further to this aspect, a third set of radio frequency measurements is received from the other sets of devices, and a fourth set of radio frequency measurements is received from other mobile devices connected to the other sets of devices.

According to some aspects, the method 800 can also include adjusting a transmission power of the first set of devices by an adjustment unit per iteration for a defined number of iterations. The number of iterations can be defined based on observance of network condition and performance indicators, according to an aspect. Further, the method 800 can include determining locations for the first mobile device and the second mobile device. Also, it can be determined that that a subset of the locations are within a network traffic coverage area of the first set of devices and another subset of the locations are within another network coverage area of the second set of devices, after the adjusting (e.g., there are no coverage holes).

In an additional or alternative aspect, the method 800 can include adjusting an antenna of the first set of devices by an adjustment unit per iteration for a defined number of iterations. Further, to this aspect, locations for the first mobile device and the second mobile device can be determined. Based on the locations, it can be determined that a subset of the locations are within a network traffic coverage area of the first set of devices and another subset of the locations are within another network coverage area of the second set of devices (e.g., there are no coverage holes), after the adjusting.

According to some aspects, the adjusting, at 808, can result in an adjusted setting. According to this aspect, the method 800 includes determining a performance indicator has degraded below a threshold value and reverting the adjusted setting to a prior setting.

Figure 9:
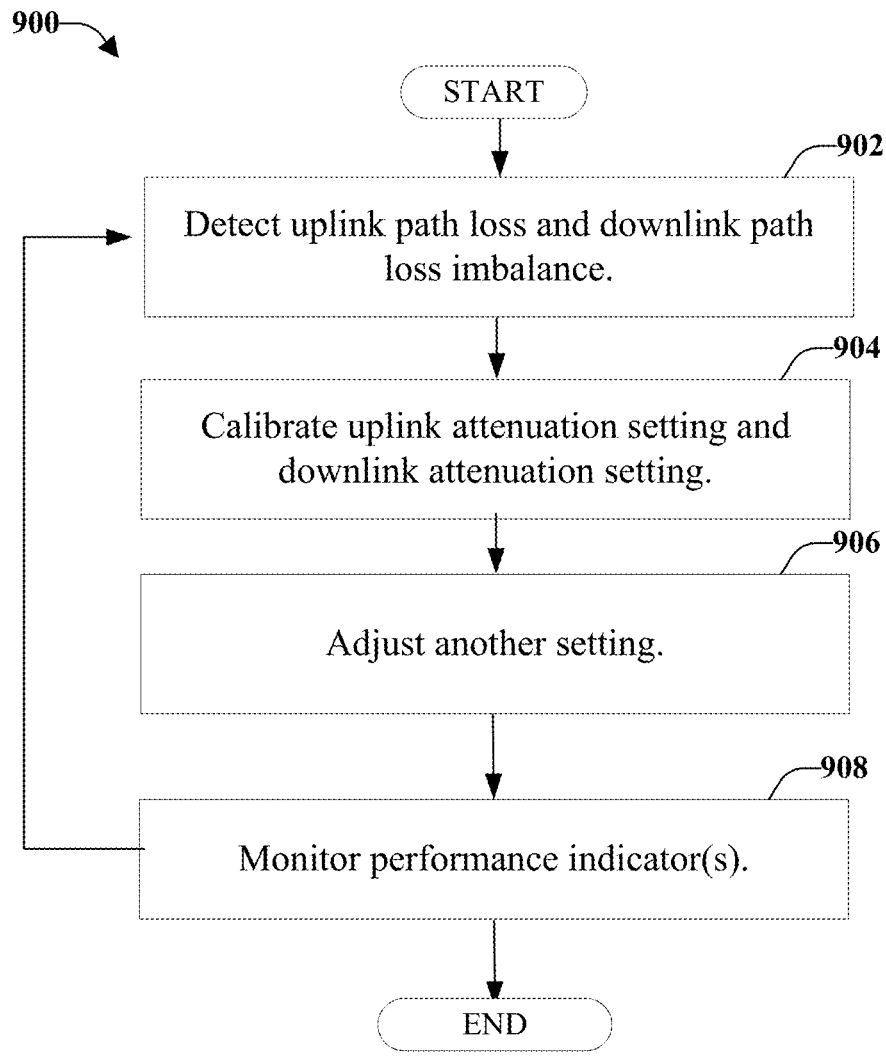
FIG. 9 illustrates an example, non-limiting method for calibrating an uplink attenuation setting and a downlink attenuation setting, according to an aspect.

FIG. 9 illustrates an example, non-limiting method 900 for calibrating an uplink attenuation setting and a downlink attenuation setting, according to an aspect. At 902, a measured imbalance in an uplink path loss and a downlink path loss of a mobile device connected to a set of devices of a cell site is detected. At 904, an uplink attenuation setting at the set of devices and a downlink attenuation setting at the mobile device can be estimated based on the imbalance between the uplink and downlink path losses. The calibration of the attenuations can help in measuring the uplink and downlink path losses and received signal strengths at mobile devices and base stations accurately. At 906, another setting can be adjusted for balancing the uplink and downlink path losses. Further, at 908, at least one performance indicator is monitored. Method 900 can return to 902 if the one or more performance indicators that are monitored reveals that the measured path losses are still not nearly balanced.

According to some aspects, the method 900 can include receiving a set of radio frequency measurements from the mobile device and the set of devices at defined intervals. Further to this aspect, another uplink path loss and another downlink path loss of another mobile device at an edge of a coverage area of the set of devices can be determined. In addition, an indicator based on a difference between the other uplink path loss and the other downlink path loss can be determined. Further to this aspect, it can be determined that the indicator exceeds a threshold level.

In accordance with some aspects, the method 900 can include determining a time of day and an environmental condition (e.g., network traffic load, amount of interference, type of interference, and so on). Further to this aspect, the method 900 can include modifying a downlink power control parameter and an uplink power control parameter based on the time of day and the environmental condition.

According to still other aspects, the method 900 can include changing a threshold parameter of the mobile device and modifying another transmit power of the set of devices. The threshold parameter of the mobile device can be a reselection parameter (for idle users) and/or a handover parameters (for users in connected mode). Modifying the transmit power of the mobile device can include changing a path loss compensation factor and adjusting a target received power applicable to the set of devices. Modifying the other transmit power of the set of devices can include adjusting the power at which the set of devices are enabled to transmit.

In accordance with another aspect, the method 900 can include measuring one or more parameters, as discussed herein, to obtain a result, or a measurement value, wherein the measurement value can be used implement at least three results (e.g., a first result, a second result, or a third result). For example, based on a first result of the measurement, the method includes adjusting a fractional power control value (e.g., alpha). Based on a second result of the measurement, method can include adjusting a target received power applicable to the set of devices (e.g., Pzero). In addition, based on a third result of the measurement, the method can include adjusting a target value representing a signal to interference ratio target. It is noted that two or more results might result from the measurement value, wherein one or more of the above noted adjustments can be implemented. According to some implementations, all three adjustment might be made. Further to this aspect, at about the same time as the uplink and downlink attenuations are calibrated, the method 900 can include changing a reselection threshold parameter of the mobile device.

Figure 10:
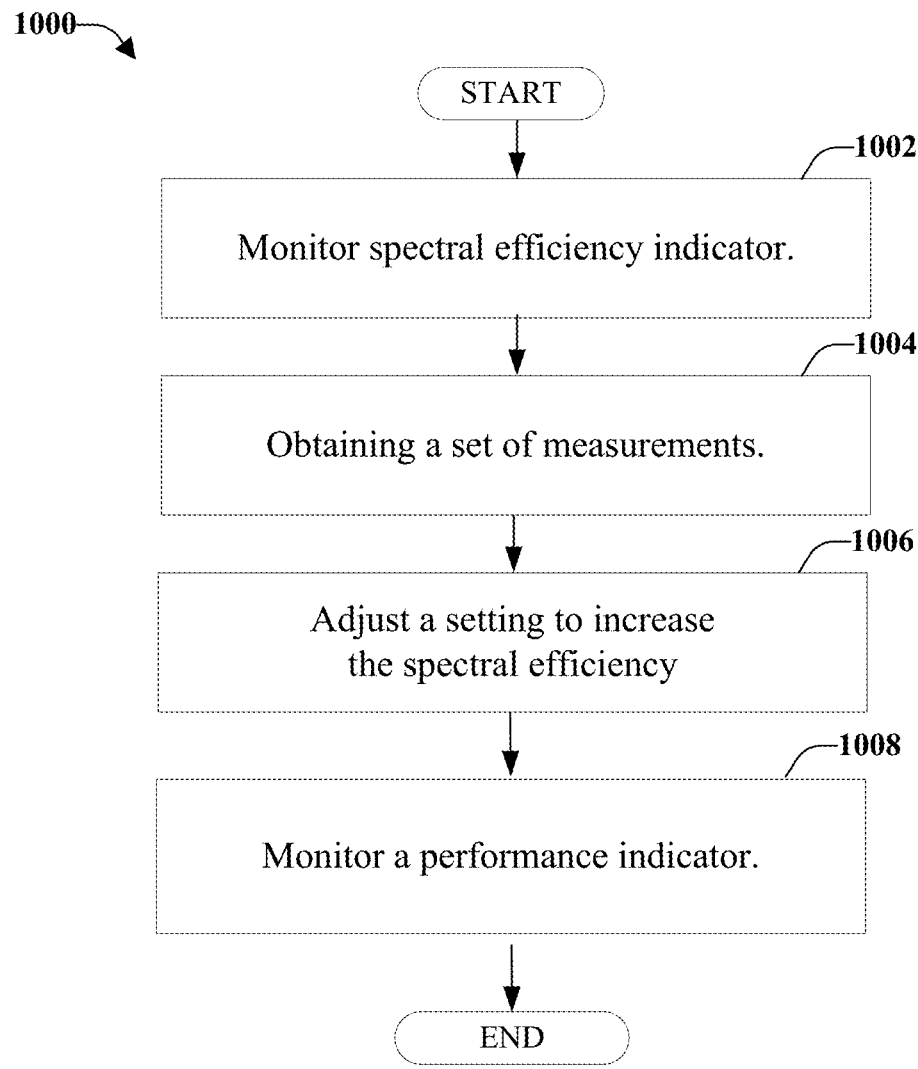
FIG. 10 illustrates an example, non-limiting method for increasing a spectral efficiency of a communications network, according to an aspect.

FIG. 10 illustrates an example, non-limiting method 1000 for increasing a spectral efficiency of a communications network, according to an aspect. Method 1000 starts, at 1002, with monitoring of a spectral efficiency indicator indicating a spectral efficiency experienced by a set of mobile devices connected to a set of devices of a cell site. At 1004, a set of measurements are obtained and at 1006, a setting is adjusted to increase the spectral efficiency as a function of the monitoring, the measurement, and a temporal indicator. A performance indicator is monitored, at 1008. If the performance indicator has degraded (or has not improved) method 1000 returns to 1002 with further monitoring.

According to some aspects, obtaining the set of measurements, at 1004, includes receiving a set of radio frequency measurements from the set of devices and another mobile device connected to the set of devices. Further, network measurements are determined, which can include determining a block error rate value, a resource utilization, a throughput value, and a multiple-input multiple-output utilization factor at the other mobile device and at the set of devices, and/or a location of the mobile device.

In accordance with some aspects, the method 1000 includes modifying a mapping between a channel quality index and a modulation and coding protocol and a selection of the transport block size based on the monitoring the performance indicator. Other aspects include modifying a block error rate target based on the monitoring the performance indicator. Still other aspects include modifying a mapping between a signal to noise plus interference ratio and a channel quality index based on monitoring the performance indicator. Another aspect includes modifying a time period based on monitoring the performance indicator. For example, the time period can include averaging measurement periods and/or adjusting reporting periods of the channel quality index and/or adjusting SINR update periods and/or the modulation/coding scheme. Yet another aspect relates to modifying a signal to noise plus interference ratio threshold value for a multiple-input-multiple output utilization.

According to some aspects, the method 1000 includes determining a cell category and a radio frequency category for the set of devices based on a set of radio frequency measurements from the set of mobile devices and the set of devices.

Additionally or alternatively, the method 1000 can include adjusting a downlink scheduler parameter based on a reference signal received power, estimated user locations (e.g., mobile device positions) in the cell, and/or channel quality index statistics for the set of devices and a radio frequency category.

Figure 11:
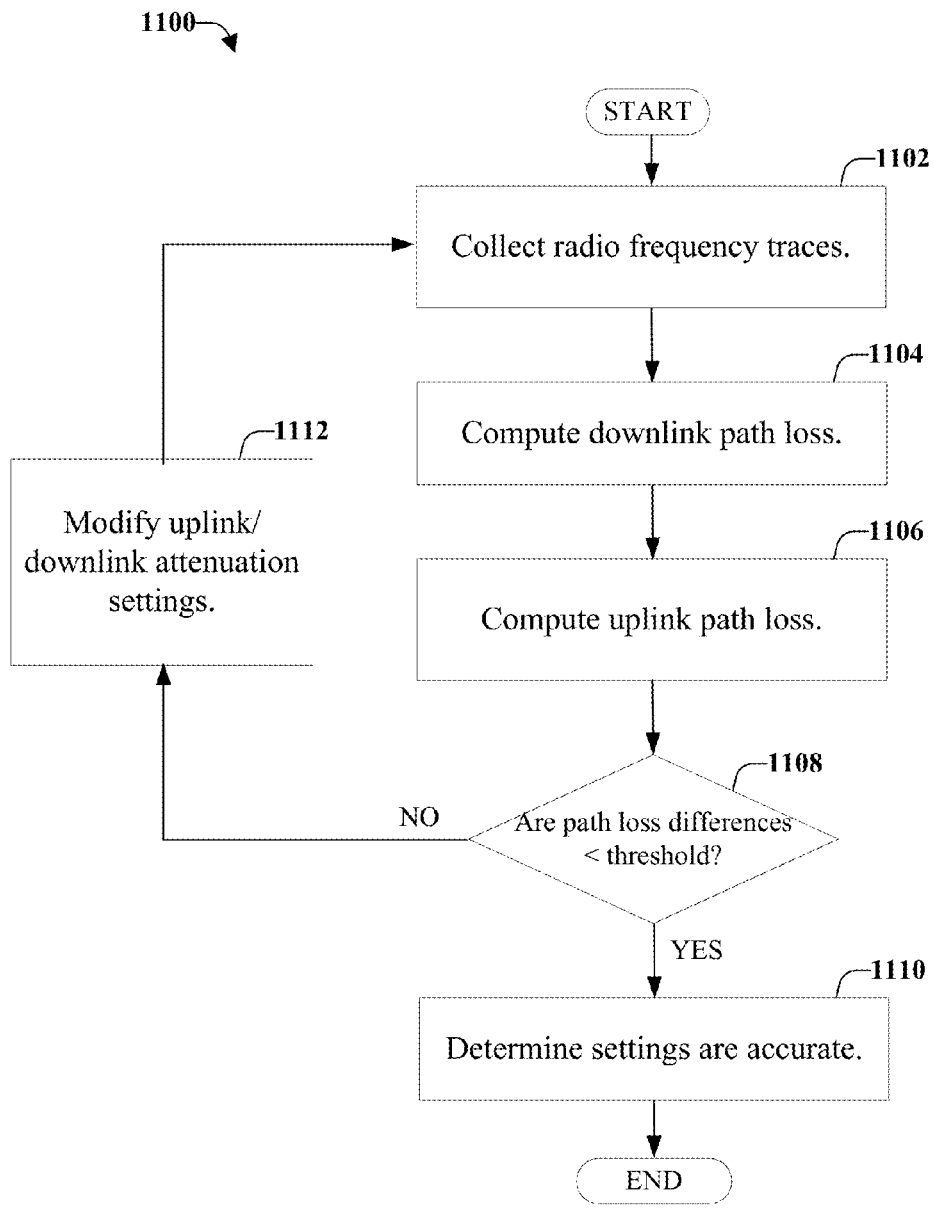
FIG. 11 illustrates an example, non-limiting method for attenuation verification, according to an aspect.

FIG. 11 illustrates an example, non-limiting method 1100 for attenuation verification, according to an aspect. The attenuation verification can be applied to a distributed antenna system, for example. Downlink and uplink attenuations assist with understanding the power transmitted by an antenna and power received by an antenna, respectively. Setting the uplink and downlink attenuation correctly assists with accurate calculation of the interference level at both the mobile device and at the base station.

At 1102, radio frequency traces are collected. Radio frequency traces that can be collected include the received signal strength at the mobile device, the received signal quality at the mobile device, the mobile device transmit power, the received power at the base station, the base station transmit power, and so forth. According to an implementation, the radio frequency traces are collected for calls that have a fixed rate (e.g., voice calls).

At 1104, the downlink path loss is calculated. The downlink path loss can be calculated as the base station transmit power minus the downlink attenuation, minus the received signal strength at the mobile device. The uplink path loss is calculated at 1106. The uplink path loss can be calculated as the mobile device transmit power minus the uplink attenuation minus the received signal strength at the base station.

A determination is made, at 1108, whether the absolute value of the difference between the downlink path loss and the uplink path loss is less than a threshold value. If the differences between the path losses is less than the threshold value ("YES"), at 1110, a determination is made that the attenuation settings are accurate and method 1100 ends.

If the differences between the path losses are determined to be more than the threshold value ("NO"), at 1112, the uplink attenuation and/or downlink attenuation are modified based on known information. Method 1100 continues, at 1102, with the collection of further and/or updated radio frequency traces.

Figure 12:
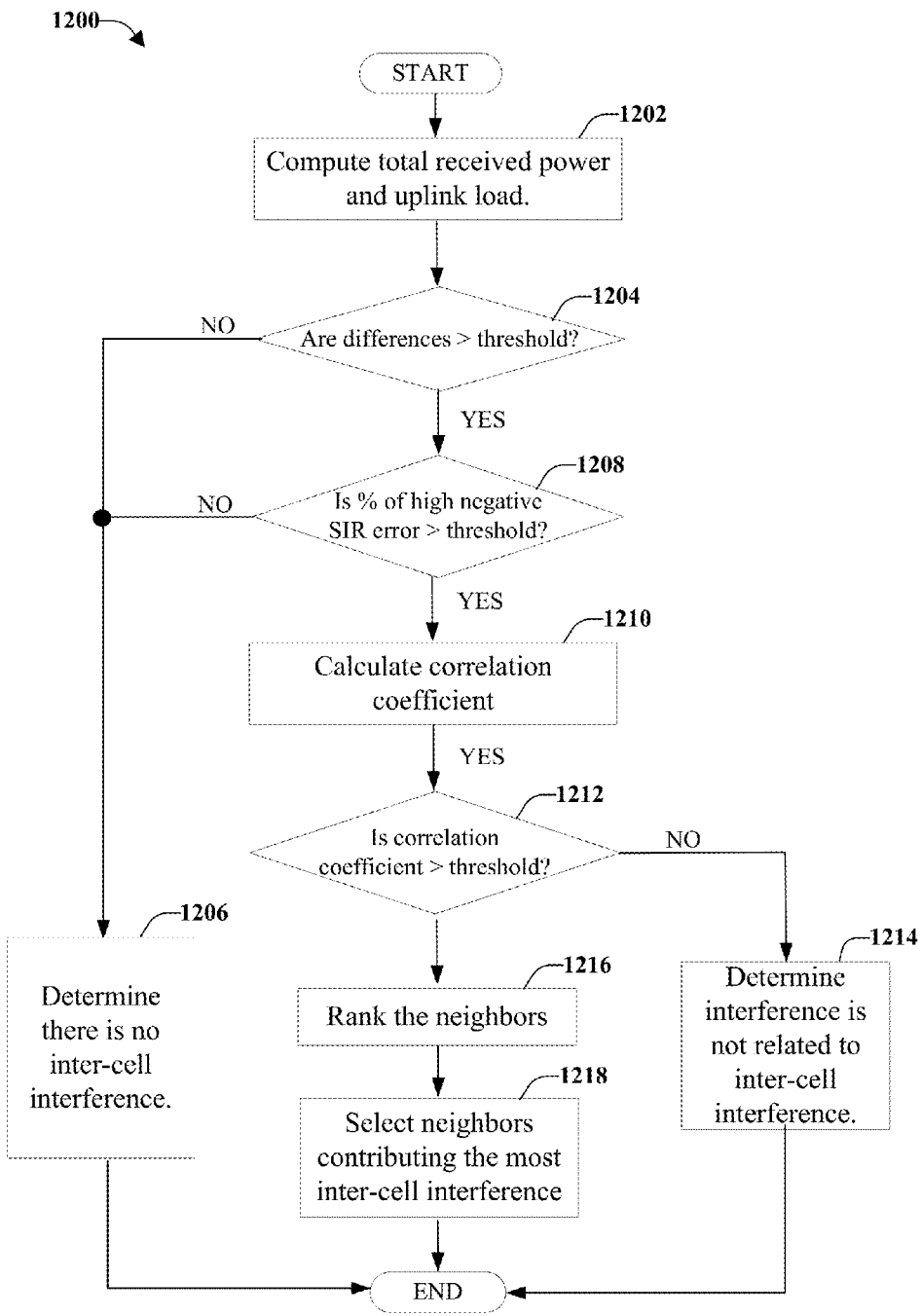
FIG. 12 illustrates an example, non-limiting method for uplink inter-cell interference detection, according to an aspect.

FIG. 12 illustrates an example, non-limiting method 1200 for uplink inter-cell interference detection, according to an aspect. After the attenuation settings are verified and/or corrected (according to the method 1100 of FIG. 11), the base stations that are affected by inter-cell interference are identified. Further, the sources of the interference are determined.

At 1202, the total received power and uplink load at the base station is calculated. Information related to the uplink load and total received power can be received from the base station in a measurement report or through another reporting mechanism. For example, base stations under consideration can automatically provide the information (e.g., through a broadcast message) or based on other criteria, such as based on a received request for the information.

A determination is made, at 1204, whether the difference between the total received power and the uplink load are more than a threshold. For example, if the total received power and the uplink load are about the same, the base station is functioning as expected. Therefore, if the determination at 1204 is that the difference between the total received power and the uplink load is not more than the threshold ("NO"), at 1206, a determination is made that there is no inter-cell interference and the method 1200 ends.

If the determination at 1204 is that the difference between the total received power and the uplink load is more than the threshold ("YES"), at 1208, a determination is made whether the percentage of high negative SIR error is more than an error threshold. If the determination, at 1208, is that the percentage of high negative SIR error is not more than the threshold ("NO"), at 1206 it is determined that there is no inter-cell interference and the method 1200 ends.

If the determination at 1208 is that the high negative SIR error is more than the threshold ("YES"), at 1210 a correlation coefficient is calculated. For example, the calculation can include a time-correlated total received power at the base station versus the percentage of mobile devices that detect more than a certain number of neighbors.

At 1212, a determination is made whether the correlation coefficient is more than a correlation threshold. If the correlation coefficient is not more than the correlation threshold ("NO"), at 1214 it is determined that the interference is not related to inter-cell interference and method 1200 ends.

If it is determined that the correlation coefficient is more than the correlation threshold ("YES"), at 1216 the neighbors are ranked. The neighbors can be ranked based on their interference contribution and the percentage of handovers to each neighbor. The interference contribution can be calculated based on a distribution of the RF condition of each neighbor verses the RF condition of the serving base station, as detected at all of the mobile devices. For example, this can be based on the average RF condition from a neighbor cell, variance of the RF condition for a neighbor, and the probability of having a certain RF condition from a neighbor. At 1218, the neighbors that are contributing the most to the inter-cell interference are selected. For example, the five neighbors contributing the most interference are selected. Although five neighbors are used as an example, any number of neighbors can be selected, according to an aspect.

Figure 13:
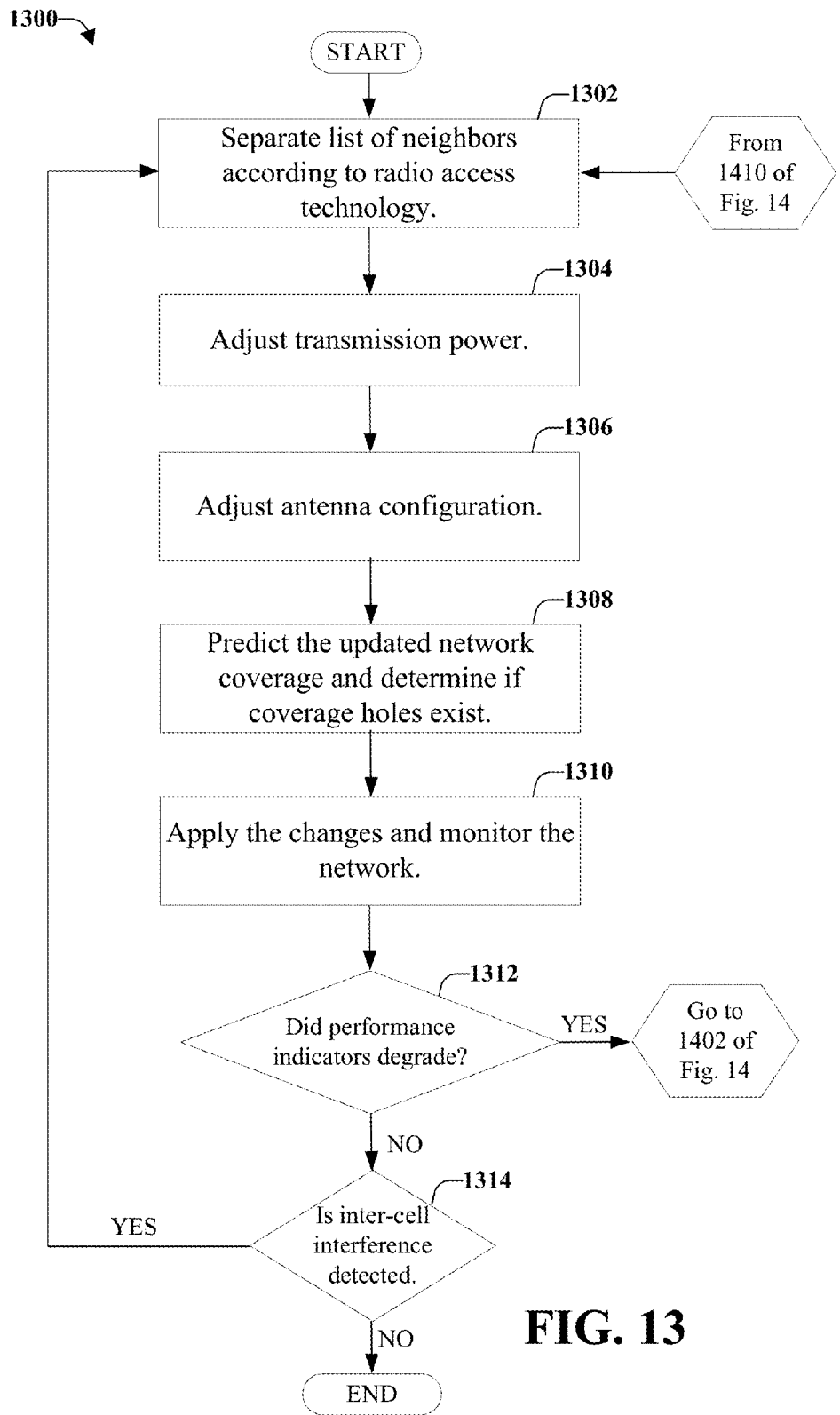
FIG. 13 illustrates an example, non-limiting method for uplink inter-cell interference mitigation, according to an aspect.

FIG. 13 illustrates an example, non-limiting method 1300 for uplink inter-cell interference mitigation, according to an aspect. If inter-cell interference has been detected, at 1302 the list of neighbors contributing the most to the inter-cell interference are separated according to radio access technology. For example, the list of neighbors contributing to the interference can be separated into two categories, such as macro cell neighbors and small cell (DAS) neighbors. However, the neighbors can be classified into other (or more) categories.

For the neighbors classified as small cells, at 1304, a transmission power of the cells can be adjusted in small steps (e.g., a reduction unit). For example, the transmission power can be reduced by 1 dB. Alternatively or additionally, if an antenna of the small cell can be adjusted (e.g., down-tilted), this can also be performed. According to some implementations, if possible, network configuration parameters can be adjusted to add the small cell to the active set of the mobile device.

For the neighbors classified as macro cells, at 1306, the antenna can adjusted (e.g., down-tilted) and the transmission power of the cell is adjusted in small steps (e.g., 1 degree down-tilt and 1 dB power reduction). In some implementations, this can result in the cell shutting down, which might be acceptable if there is sufficient overlap in the cell coverage areas and/or if the cell is contributing an excessive amount of interference. If the antenna of a macro cell does not need to be adjusted, only the transmission power of the cell might be reduced. According to some implementations, only the antenna of the cell is adjusted.

A 1308, a mobile device positioning algorithm is utilized to determine a location of the mobile device. Further, the updated network coverage is predicted to make sure there are no coverage holes. At 1310, the changes are applied and the network is monitored for at least a predetermined amount of time to detect if inter-cell interference is still occurring in the network.

A determination is made at 1312 whether the identified performance indicators degraded. If the key performance indicators have not degraded due to the network changes ("NO"), at 1314, a determination is made whether inter-cell interference is detected. If no inter-cell interferences is detected ("NO"), method 1300 ends. If inter-cell interference is detected, method 1300 returns to 1302.

Figure 14:
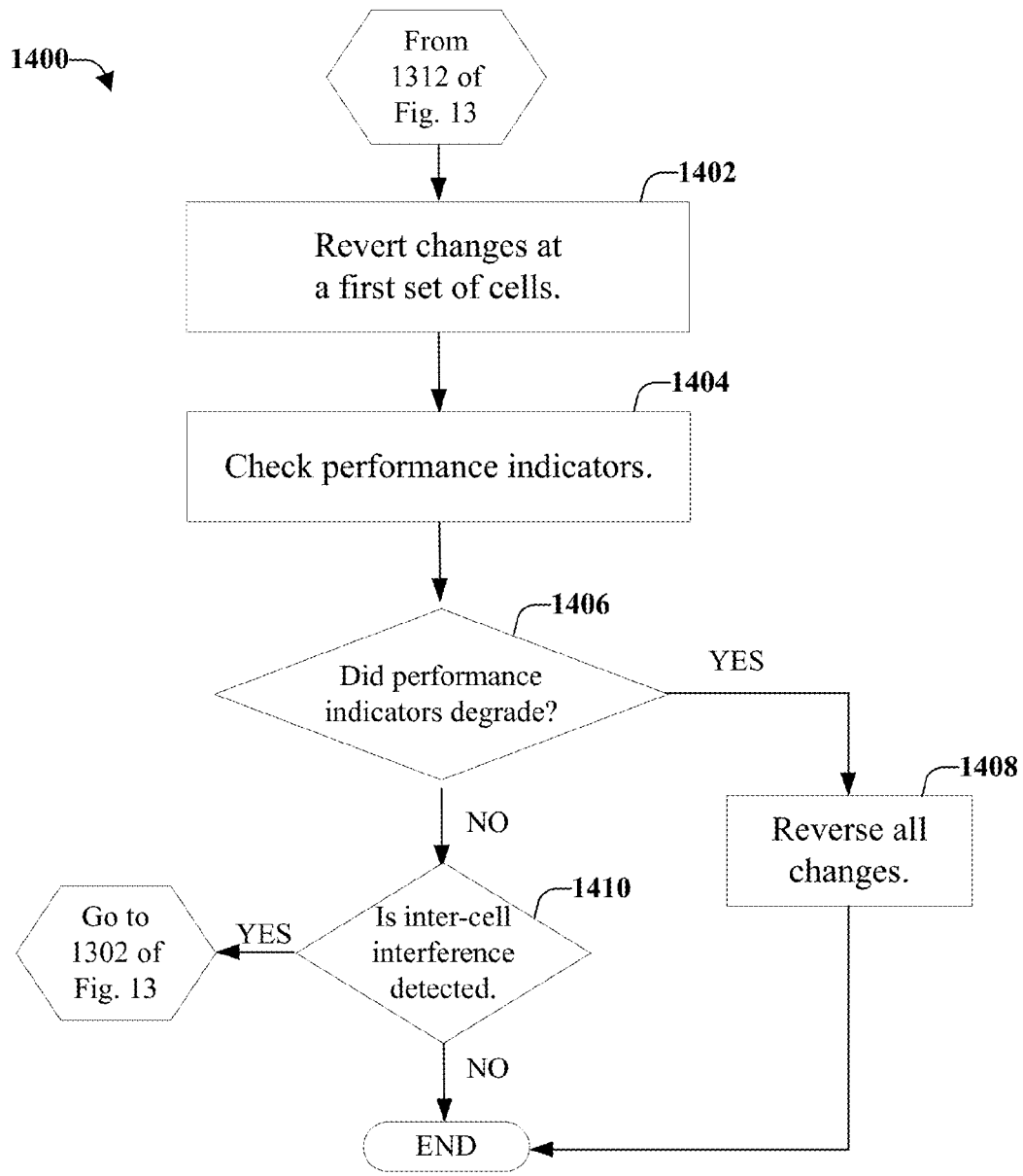
FIG. 14 illustrates an example, non-limiting method for inter-cell interference mitigation, according to an aspect.

If the determination at 1312 is that the key performance indicators had degraded, the method continues at FIG. 14, which illustrates an example, non-limiting method 1400 for inter-cell interference mitigation, according to an aspect.

At 1402, changes applied to a first set of cells are reverted, or returned to a previous setting. The first set of cells can be cells that have provided bad coverage reports (e.g., Event A1). In another example, the first set of cells can be cells that have a high uplink load. The performance indicators are rechecked at 1404 and, at 1406, a determination is made whether the performance indicators have degraded.

If the determination is the performance indicators are still degrading ("YES"), at 1408, all changes previously made are reverted such that the cells are returned to their original settings and method 1400 ends. In this case, new carriers might be needed for overload cells and/or cells may need to be physically moved.

If the determination is the performance indicators are not degrading ("NO"), at 1410 a determination is made whether inter-cell interference is detected. If no inter-cell interference is detected ("NO"), method 1400 ends. If inter-cell interference is detected, at 1410, method 1400 returns to 1302 of FIG. 13.

Further details related to one or more of the disclosed aspects are now provided with respect to the following example UMTS self-optimizing network (SON) method. There are defined objective metrics per phase, which can include load balancing, overlap reduction, and active set "herding". The load balancing is concerned with the downlink power utilization and the uplink load. These metrics and/or various quantities should be balanced across sector "faces", including co-located sectors of other NodeBs. As long as these are co-located, they should be balanced. The various quantities can include downlink code utilization (expressed as a percentage), downlink power utilization (expressed as a percentage), and uplink load (expressed as a ratio).

For overlap reduction (which is related to a 3G implementation), if an active set member percentage is more than two members, which is the number of mobile devices that report more than two members in their active set, then adjustments should be made. In some cases, there is a service cell and one or more other cells that can be utilized for handover. If more than two members, this percentage is high. This can indicate that there is excessive overlap between cells. Thus, the cell can have downlink interference and/or the cell is overshooting. There can also be noise raised over the load of the cell, which is uplink interference (rise over own load). In this case, the noise rise is high and its mobile devices might be causing the uplink interference to the neighbors.

Also considered are the active set member percentages that are equal to one member in the active set. A low value indicates that the cell has a lack of dominance and/or has excessive downlink interference. In this case there are not many mobile devices that only connect to that cell. Further, even mobile devices that are close to that cell can see other neighboring cells at similar signal strength. This indicates excessive overlap.

The next consideration is the handover vector for each cell, which contains mostly direct neighbor handovers and indicates the number of handovers to each of the neighbors. If the vector is large, the cell is overshooting and causing downlink interference or is interfered with from a large number of neighbors. If handovers per neighbor relation are not available, a propagation delay can be utilized to determine the overshooters.

If the cell is carrying an abnormally small load, it can be due to interference in either or both the uplink and the downlink.

If the percentage of SIR Error reports that are less than about −10 db is a high percentage, there might be mobile device transmit power issues due to high noise rise. This means that the noise rise has a negative impact on call drop and indicates interference.

In an UMTS implementation, in order to reduce the overlap and mitigate interference, active set herding can be performed. In this case, an attempt is made to force neighbors into the active set. There is a limit to the active set size and, therefore, forcing the neighbors into the active set might not always be possible. However, if there is sufficient space in the active set, forcing the neighbors into the active set is performed so that the neighbors can power control the mobile device, which can also help to reduce the interference.

The following are example UMTS SON scenarios for purposes of describing the one or more aspects. In a first scenario, the cell is an overshooter. The cell has a reasonable % ACT=1 but large handover (HO) Matrix (and large % ACT>2) and likely causing interference to other nearby cells (possibly macro cells). The cell might not have high uplink noise since the uplink interfering mobile devices might be relatively far away. The solution here can be to reduce CPICH or reduce TILT (e.g., an antenna configuration).

In a second scenario, the cell has a lack of dominance. In this case, the cell has a low % ACT=1 but may still have large HO Matrix due to neighbor interference (large % ACT>2) and would have high uplink noise (since mobile devices would be relatively close). The solution here can be to reduce neighbor interference first, then increase CPICH or increase TILT at the serving cell.

In a third example scenario, there is a normal cell but excessive low load with interference. The cell has a very low load (Erlangs/ADCH Erlangs/etc.) and high uplink noise and is not an overshooter and also does not lack dominance (medium % ACT=1). The solution in this example scenario might be to balance the uplink/downlink coverage and reduce neighbor interferers first and then reassess all the cells.

In a fourth example scenario, there is a normal cell, but excessive low load, no interference, and neighbor cells carry a high load. The cell has a low load and low uplink noise and low % ACT>2. The solution here can be to increase coverage via increase in CPICH and/or TILT, and/or add additional carriers.

In a fifth example scenario, there is a normal cell but excessive high load with interference. The cell has very high PS/CS (packet switched/circuit switched) Erlang load, but is not an overshooter and also does not lack dominance, but has high noise and high % ACT>2 (e.g., being interfered with). The solution here can be to remove neighbor interference (e.g., lower the neighbor CPICH/TILT).

According to a sixth example scenario with a normal cell, but excessive high load with little interference. Here there is a high load and low uplink noise and low % ACT>2. The solution in this scenario can be to lower CPICH and/or TILT.

Figure 15:
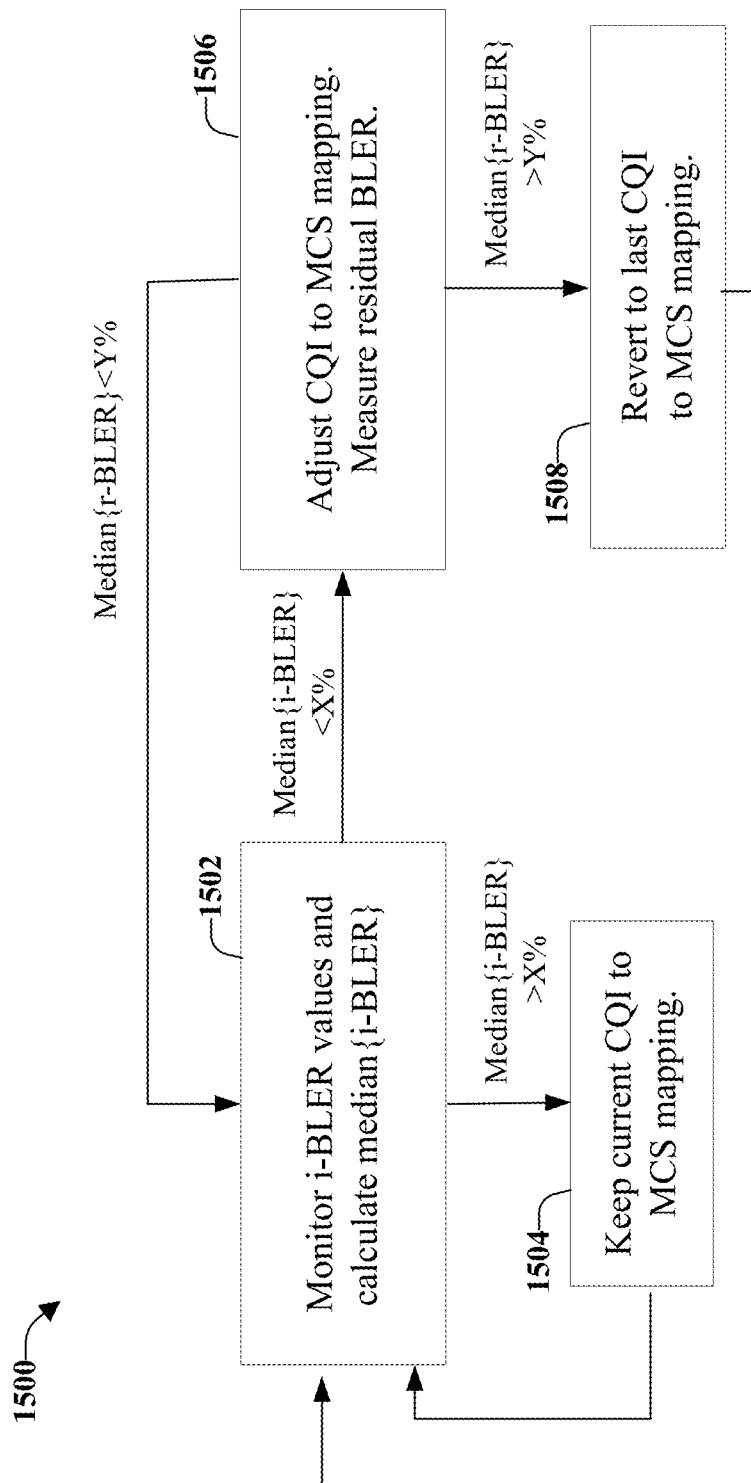
FIG. 15 illustrates an example, non-limiting method for adaptive channel quality index to modulation coding scheme, according to an aspect.

FIG. 15 illustrates an example, non-limiting method 1500 for adaptive channel quality index to modulation coding scheme, according to an aspect. The mobile devices compute the channel quality index (CQI) based on data received from the base station. The mobile device reports the channel quality index back to the bases station, which remaps the computations performed by the mobile device. A modulation coding scheme (MCS) is one of the indices, which can be mapped to a table or database, which converts the modulation coding scheme to a transport block size. Once a modulation and coding scheme is chosen, there is a block size on which to transmit on the downlink. The mobile device evaluates the information (after demodulation of the data) and may adjust the channel quality index (e.g., upwards, downwards) or may keep the channel quality index the same. This mapping is modified with a closed loop system, which includes an inner loop from the mobile device to the base station.

In some cases, the base station might be conservative in assignments and might assign smaller transport blocks than a size that would optimize spectral efficiency. Thus, according to an aspect, the closed loop can make the block error rate (BLER) more aggressive. For example, the base station does not receive the BLER from the mobile device but instead attempts to estimate how many acknowledgements versus non-acknowledgements are received. If there are numerous non-acknowledgements, the base station might be more conservative with the MCS, for example.

At 1502, the i-BLER (initial BLER) values are monitored. The monitoring can occur at regular intervals, such as every T1 minutes or based on another schedule. A median {i-BLER} is calculated. If the median{i-BLER} is more than a defined percentage (e.g., X %), at 1504, the current CQI to MCS mapping is maintained and method 1500 returns to 1502.

If the median{i-BLER} is less than the defined percentage (e.g., X %), at 1506, the CQI to MCS mapping is adjusted. The mapping can be adjusted to be proportional Y={median{i-BLER}−Z %}. The residual BLER is measured, which can be over a time period, such as T2 minutes. The median{r-BLER} is calculated.

If the median{r-BLER}<Y, method 1500 continues at 1502. If the median{r-BLER} is more than a second percentage (e.g., Y %), at 1508, the last CQI to MCS mapping is reverted to, with median{r-BLER} less than the second percentage (Y %) and method 1500 returns to 1502.

Thus, the mapping can be modulated as a function of time and per cell according to this implementation. The mapping is adaptive (not fixed) and can be aggressive. For example, if there are too many errors in transmission, the dynamic mapping can mitigate these errors by employing less aggressive mappings.

It is noted that the i-BLER and r_BLER are monitored per modulation type. Further, the CQI-MCS mappings can be adaptively changed per modulation type.

Figure 16:
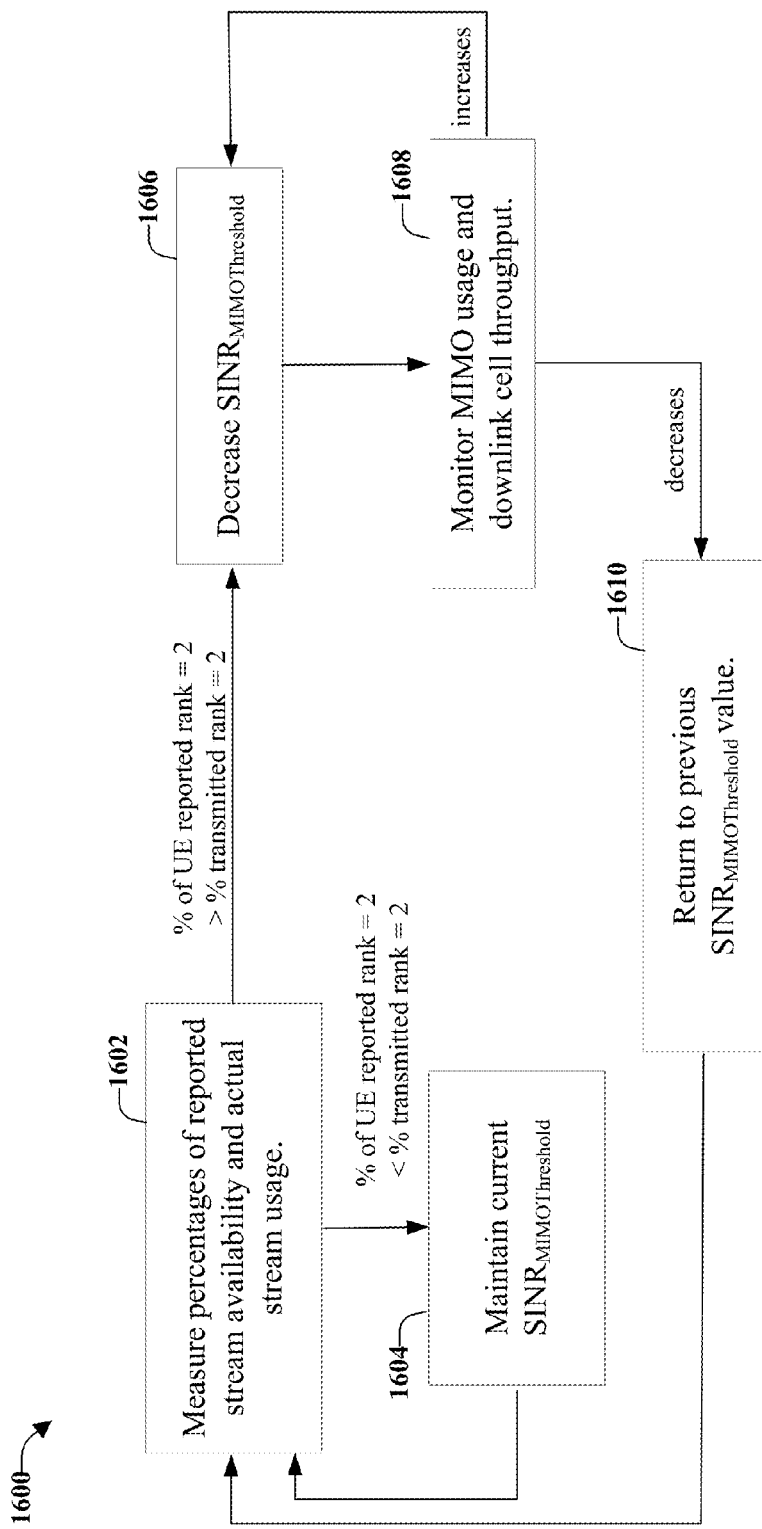
FIG. 16 illustrates an example, non-limiting method for adaptive multiple input multiple output system optimization, according to an aspect.

FIG. 16 illustrates an example, non-limiting method 1600 for adaptive multiple input multiple output (MIMO) system optimization, according to an aspect. In an example, MIMO system, there can be two (or more) antennas at the base station and two (or more) antennas at the mobile device. Two antennas at each device can ideally double the throughput on both the downlink and the uplink. The mobile device can report the channel quality index and informs the base station that the mobile device can receive two streams (e.g., a two-layer stream, two code words) simultaneously, or at substantially the same time. For example, a first piece of data can be transmitted to/received by respective first antennas and a second piece of data can be transmitted to/received by respective second antennas.

In some cases, even if the mobile device indicates that it can support multiple streams, if the signal-to-noise-ratio (SNR) is not above a threshold SNR level, the information from the mobile device is ignored and only one stream is used. According to an aspect, the threshold SNR level can be varied as a function of one or more metrics (e.g., MIMO usage, MIMO throughput, and so on).

At 1602, the percentage of when the mobile device reported rank is equal to the value two (where rank indicates stream) and the percentage of when the transmitted rank is equal to two are measured. These percentages can be measured over a predetermined interval (e.g., T1 minutes). If the percentage of the reported stream availability is less than the actual usage of the reported stream availability, the current $SINR_{MIMOThresh}$ is maintained, at 1604, and method 1600 returns to 1602.

If, however, the percentage of the reported stream availability is more than the actual usage of the reported stream availability, at 1606, the $SINR_{MIMOThresh}$ is decreased. According to an implementation, the $SINR_{MIMOThresh}$ can be decreased by the percentage of mobile device reported rank equal to two divided by the percentage of transmitted rank equals two multiplied by XdB until $SINR_{MIMOThresh}$ is equal to Y dB (limit on lowest value for threshold).

At 1608, the MIMO and downlink cell throughput are monitored. For example, the MIMO usage and downlink cell throughput can be monitored for a configurable interval, such as T2 minutes. If the MIMO usage and downlink cell throughput increases, method 1600 returns to 1606 and the $SINR_{MIMOThresh}$ is decreased again. This act can be recursive such that the $SINR_{MEMOThresh}$ can be decreased to a limit on the lowest value for the threshold.

If the monitoring, at 1608, indicates the MIMO usage and downlink cell throughput has decreased, at 1602, the $SINR_{MIMOThresh}$ value is reverted to the previous $SINR_{MIMOThresh}$ (e.g., the $SINR_{MIMOThresh}$ before the most recent change). Thereafter, method 1600 returns to 1602.

Figure 17:
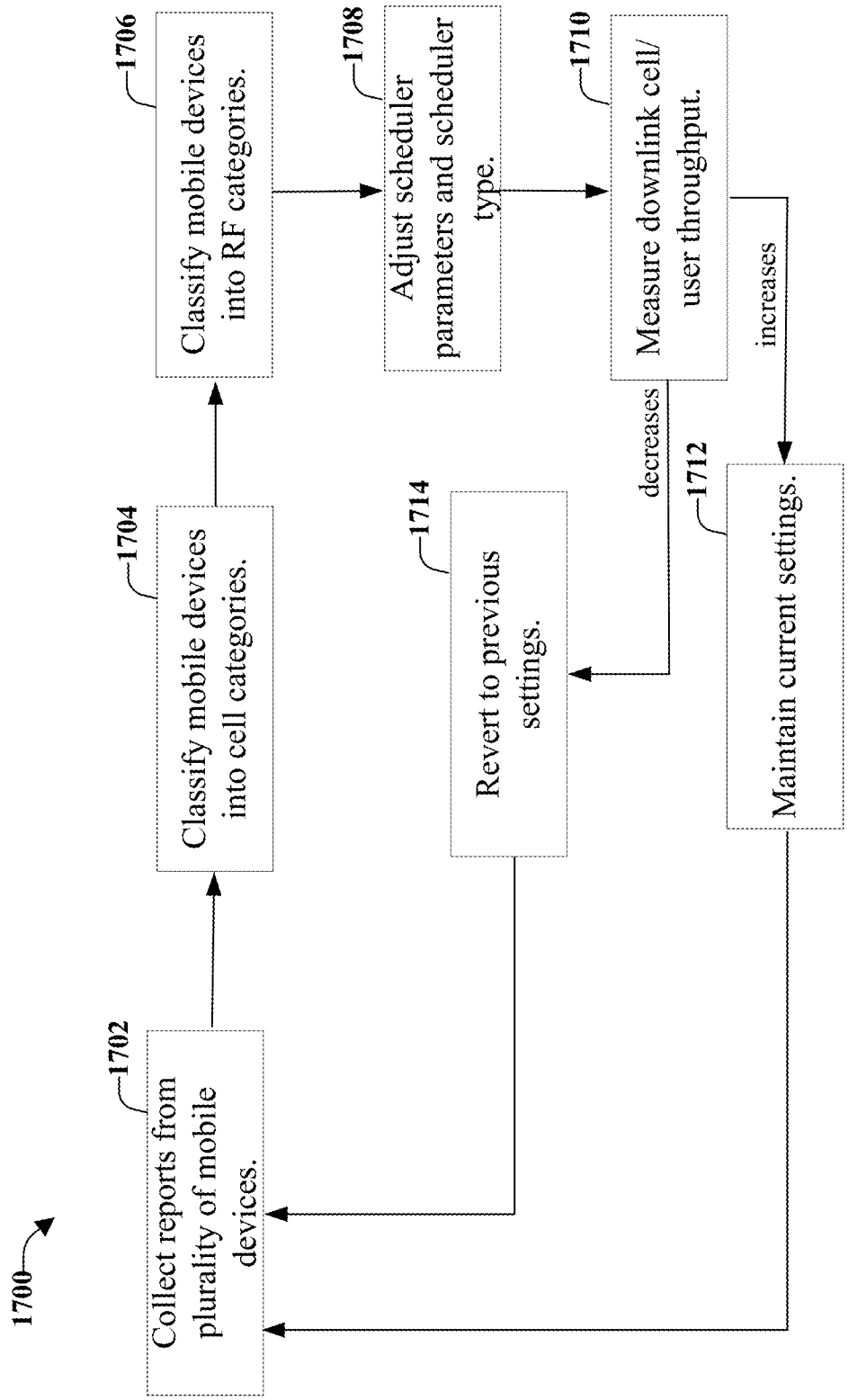
FIG. 17 illustrates a method for an adaptive downlink scheduler, according to an aspect.

FIG. 17 illustrates a method 1700 for an adaptive downlink scheduler, according to an aspect. There are various parameters in the scheduler that can be adjusted. For example, the parameters can be configured in one way for mobile devices that have bad radio conditions and another way for mobile devices that have good radio conditions and/or to increase the spectral efficiency for a given cell. Round robin can be used to increase the spectral efficiency for congested cells with many cell edge users that can stymie middle of the cell users. Proportional fair can provide an advantage to cell edge users over middle of the cell users. The scheduler policies (e.g., round robin, proportional fair, and so one) can be adjusted to be optimal based on measured spectral efficiency of the cell and other metrics that provide an objective view of user satisfaction, and so forth.

At 1702, respective reports are collected from the mobile devices. The reports can provide the radio conditions as observed by each mobile device. In an example the reports can include RSRP, RSRQ, CQI statistics, and so on. The mobile devices from which the reports are collected can be those mobile devices located in a particular cell. Further, the reports can be collected for a predetermined time interval (e.g., T1 minutes).

At 1704, the mobile devices can be classified according to a cell coverage category. For example, each cell might have users (e.g., mobile devices) at the edge of the cell or predominantly at the edge, or the mobile devices can be closer to the base station. Further, each mobile device can have a good radio frequency condition, a medium radio frequency condition, a bad radio frequency condition, or any condition therebetween. According to an aspect, the radio frequency condition can be a function of the distance between the respective mobile device and the base station. According to an implementation, the mobile devices are classified using CQI histograms, however, other manners of classifying the devices can be utilized.

The mobile devices are classified into radio frequency (RF) categories, at 1706. Thus, in each cell coverage category, the mobile devices in the respective cell coverage category are further classified by the radio frequency categories.

Based on the classifications and subclassifications, the scheduler parameters and type are adjusted, at 1708 For example, the scheduler parameters can relate to user weights. The scheduler type can be a round robin type, a proportional fair type, and so on. The adjustments can be based on the cell and radio frequency category for the particular cell under consideration.

The downlink cell and user throughput is measured, at 1710. The measurement can be performed over a period of time, such a T2 minutes. Based on the monitoring, if it is determined that the downlink cell and/or user throughput increases, the current settings are maintained, at 1712, and method 1700 continues at 1702. If the monitoring at 1710 indicates that the downlink cell and/or user throughput decreases, at 1714, a most recent change to the parameters values is reverted and method 1700 continues at 1702.

Figure 18:
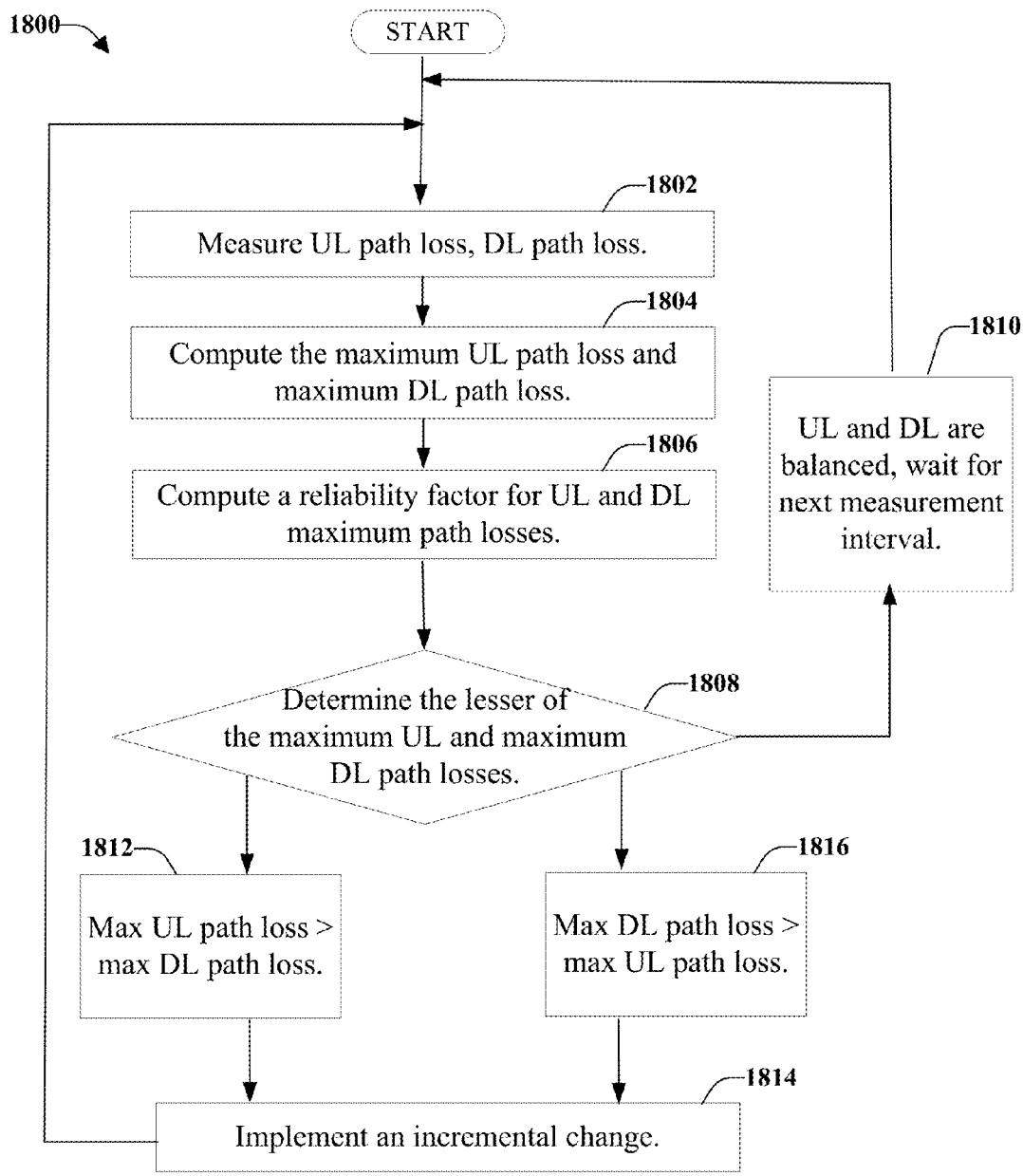
FIG. 18 illustrates an example, non-limiting method for achieving desired coverage and balancing an uplink coverage and a downlink coverage, according to an aspect.

FIG. 18 illustrates an example, non-limiting method 1800 for achieving desired coverage and balancing an uplink and downlink coverage, according to an aspect. The path loss at the cell edge can be computed as:

Cell-Edge PL=min(Max DL Tx. Power At Antenna–Bandwidth Scaling Factor–Power Boost, Max UE Tx Power–Noise Floor At Antenna), where the downlink path loss is given by the maximum downlink (DL) transmit (Txt) power at antenna minus the bandwidth scaling factor minus power boost. Further, the uplink path loss is give by maximum (Max) user equipment (UE) transmit (Tx) power minus Noise Floor at antenna. Parameters for the mobile device are adjusted based on observing an imbalance in the uplink and downlink path loss at the cell edge.

The base station can set parameters for the mobile device in order to control the uplink coverage. These parameters can control the power at which the mobile device transmits. There are a few parameters that can be modified. For example, a parameter that can be modified is referred to as Pzero, which represents the target nominal signal level received at the base station. Pzero governs the received power at the base station. Another parameter that can be modified is a path loss compensation factor (alpha). The alpha factor is a parameter that compensates for the path loss between the mobile device and the base station. These parameters (e.g., Pzero and alpha), as well as other parameters, can be set by the cell edge path loss or the minimum path loss, and the target SIR.

With continuing reference to FIG. 18, at 1802, an uplink path loss and a downlink path loss are measured. At 1804, the maximum uplink path loss and maximum downlink path loss are computed and at 1806, a reliability factor for the uplink and downlink maximum path losses is calculated.

At 1808, a determination is made as to whether the maximum uplink path loss, or the maximum downlink path loss, represents the lower value. If the uplink and downlink are balanced (e.g., a difference between the values is within an acceptable range or threshold, as determined by the network operator, operating parameters, within a typical variance level, an expected variance, and so on), method 1800 waits for a next measurement interval, at 1810, which can include returning to 1802 for a next measurement.

If it is determined that the maximum uplink path loss value is more than the maximum downlink path loss value, at 1812, method 1800 continues, at 1814, with implementation of an incremental change. In this case, the incremental change includes reducing the downlink thresholds to increase the downlink coverage and method 1800 returns to 1802 (e.g., recursively) for further measurements (e.g., feedback loop).

If it is determined that the maximum downlink path loss value is more than the maximum path loss value, at 1816, then at 1814 another incremental change is implemented. In this case, various parameters, such as alpha and Pzero, can be adjusted via the SIR target in the cell edge to increase the uplink coverage. Method 1800 returns to 1802 for further measurements (e.g., feedback loop).

By way of example, a first set of values that are computed can be the cell edge path loss using the maximum base station (e.g., eNodeB) power value and other base station (e.g., LTE eNodeB) configuration setting parameters. The values can be measured for a defined time period (e.g., T1 minutes), which might be a configurable time period. Based on the computed cell edge path loss and the SIR target, the alpha factor (path loss compensation factor) for both PUSCH and PUCCH and Pzero are determined. For example, if the uplink path loss is less than the downlink path loss, the mobile device (UE) transmit power is controlled using these parameters and, thus, the noise rise governing the mobile device coverage is changed to compensate for the uplink and downlink path loss delta.

The error between the uplink and downlink coverage can be determined. If there is a delta between the two coverage values, the cell edge path loss is adjusted and iterates, as described above, until the error becomes less than a threshold and the desired overall coverage is obtained (min (UL coverage, DL coverage)). When the error reaches above the threshold, the process would re-initiate again and iterate until a satisfactory small error is obtained. Further, according to an implementation, an outer loop may be implemented that has a target overall coverage and iterates the outer loop to achieve the desired coverage while the inner loop attempts to balance the uplink and downlink coverages.

Figure 19:
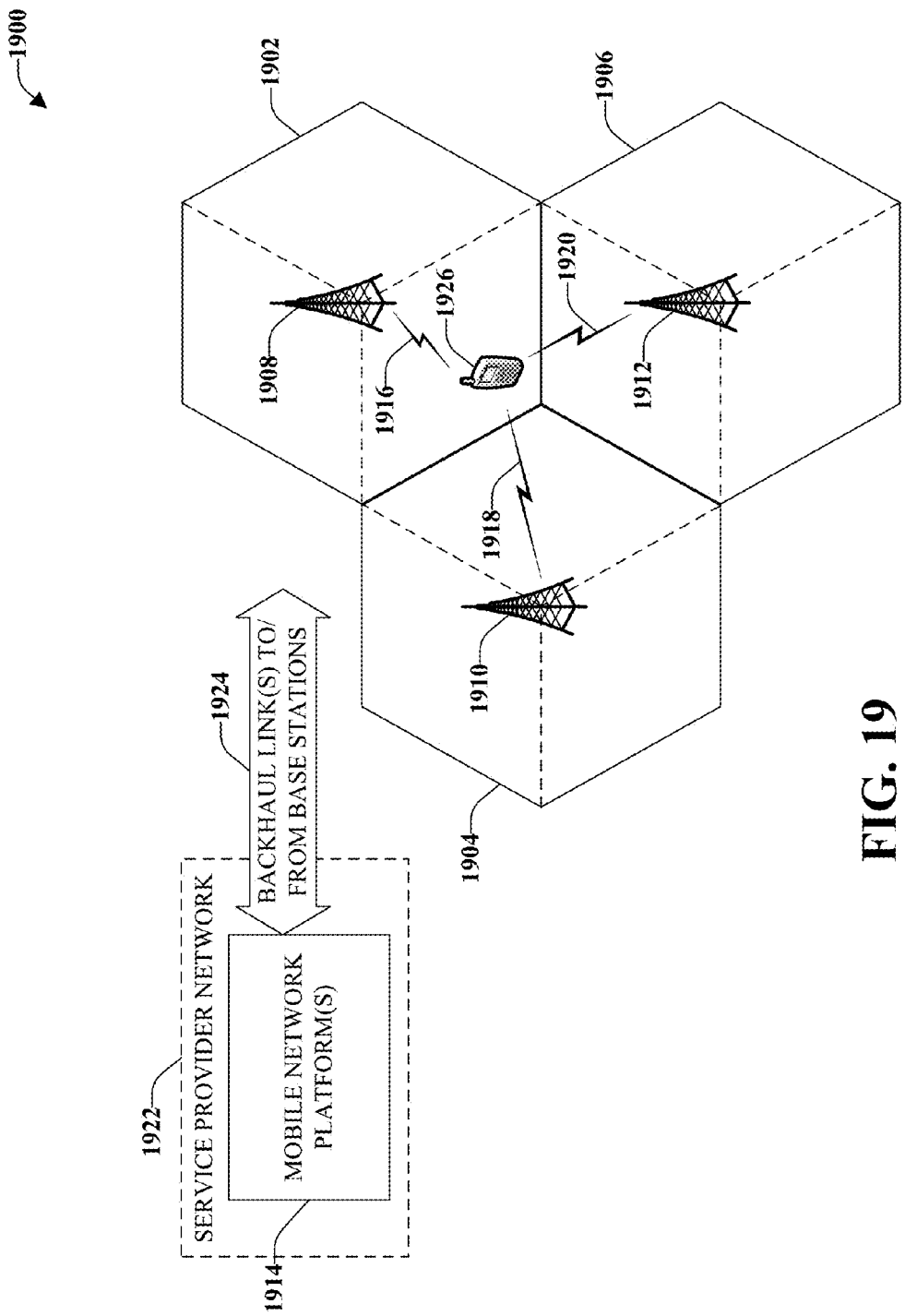
FIG. 19 is a schematic example wireless environment that can operate in accordance with aspects described herein.

By way of further description with respect to one or more non-limiting ways to facilitate mitigation of interference and load balancing, FIG. 19 is a schematic example wireless environment 1900 that can operate in accordance with aspects described herein. In particular, example wireless environment 1900 illustrates a set of wireless network macro cells. Three coverage macro cells 1902, 1904, and 1906 include the illustrative wireless environment; however, it is noted that wireless cellular network deployments can encompass any number of macro cells. Coverage macro cells 1902, 1904, and 1906 are illustrated as hexagons; however, coverage cells can adopt other geometries generally dictated by a deployment configuration or floor plan, geographic areas to be covered, and so on. Each macro cell 1902, 1904, and 1906 is sectorized in a $2\pi/3$ radians per sector configuration in which each macro cell includes three sectors, demarcated with dashed lines in FIG. 19. It is noted that other sectorizations are possible, and aspects or features of the disclosed subject matter can be exploited regardless of type of sectorization. Macro cells 1902, 1904, and 1906 are served respectively through base stations or eNodeBs 1908, 1910, and 1912. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1914, and set of base stations (e.g., eNode B 1908, 1910, and 1912) that serve a set of macro cells; electronic circuitry or components associated with the base stations in the set of base stations; a set of respective wireless links (e.g., links 1916, 1918, and 1920) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 1916, 1918, and 1920 embody a Uu interface (universal mobile telecommunication system Air Interface).

Mobile network platform(s) 1914 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 1922 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 1914 can control and manage base stations 1908, 1910, and 1912 and radio component(s) associated thereof, in disparate macro cells 1902, 1904, and 1906 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 1914 can be embodied in the service provider network 1922.

In addition, wireless backhaul link(s) 1924 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 1924 embodies IuB interface.

It is noted that while exemplary wireless environment 1900 is illustrated for macro cells and macro base stations, aspects of the disclosed subject matter can be implemented in micro cells, pico cells, femto cells, or the like, wherein base stations are embodied in home-based equipment related to access to a network.

Figure 20:
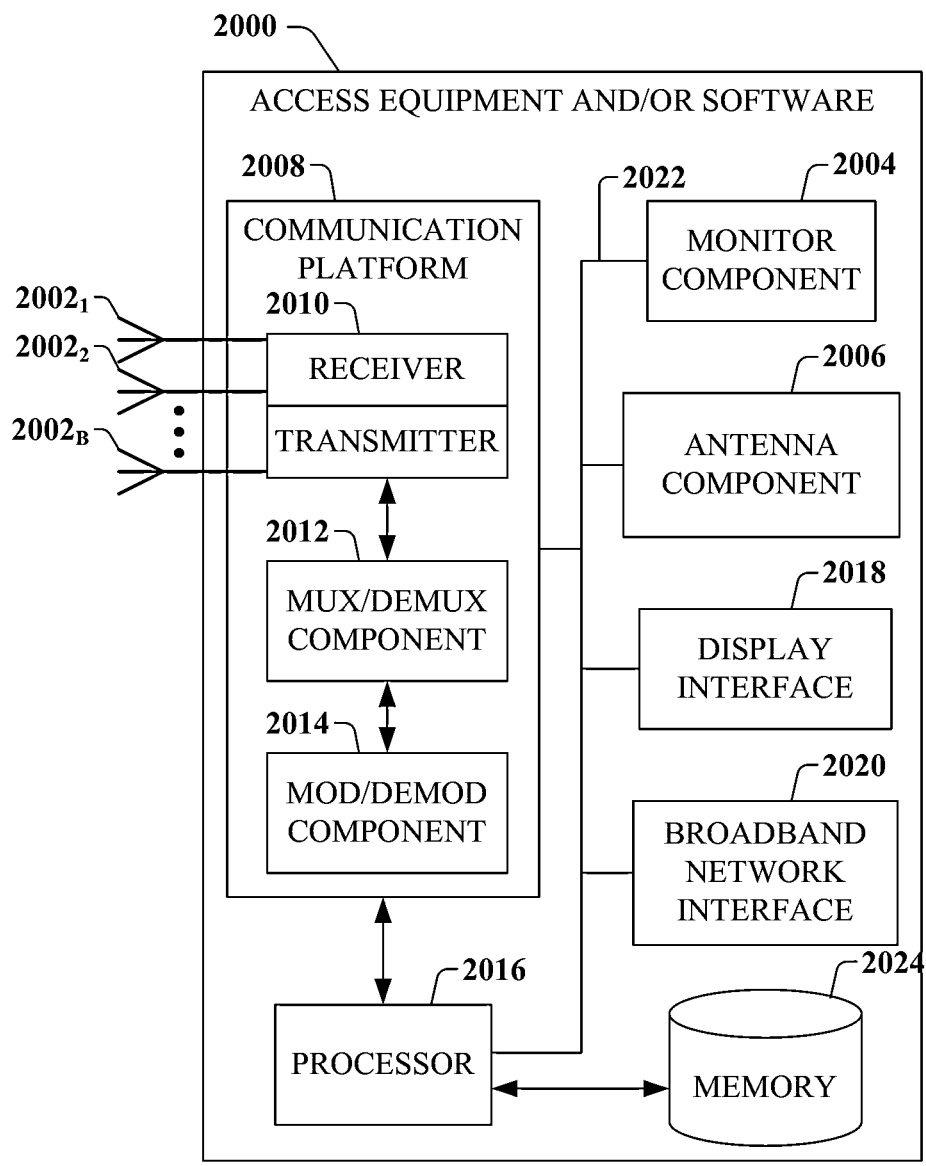
FIG. 20 illustrates a block diagram of access equipment and/or software related to access of a network, in accordance with an embodiment.

To provide further context for various aspects of the disclosed subject matter, FIG. 20 illustrates a block diagram of an embodiment of access equipment and/or software 2000 related to access of a network (e.g., base station, wireless access point, femto cell access point, and so forth) that can enable and/or exploit features or aspects of the disclosed aspects.

Access equipment and/or software 2000 related to access of a network can receive and transmit signal(s) from and to wireless devices, wireless ports, wireless routers, etc. through segments $2002_1$-$2002_B$ (B is a positive integer). Segments $2002_1$-$2002_B$ can be internal and/or external to access equipment and/or software 2000 related to access of a network, and can be controlled by a monitor component 2004 and an antenna component 2006. Monitor component 2004 and antenna component 2006 can couple to communication platform 2008, which can include electronic components and associated circuitry that provide for processing and manipulation of received signal(s) and other signal(s) to be transmitted.

In an aspect, communication platform 2008 includes a receiver/transmitter 2010 that can convert analog signals to digital signals upon reception of the analog signals, and can convert digital signals to analog signals upon transmission. In addition, receiver/transmitter 2010 can divide a single data stream into multiple, parallel data streams, or perform the reciprocal operation. Coupled to receiver/transmitter 2010 can be a multiplexer/demultiplexer 2012 that can facilitate manipulation of signals in time and frequency space. Multiplexer/demultiplexer 2012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 2012 can scramble and spread information (e.g., codes, according to substantially any code known in the art, such as Hadamard-Walsh codes, Baker codes, Kasami codes, polyphase codes, and so forth).

A modulator/demodulator 2014 is also a part of communication platform 2008, and can modulate information according to multiple modulation techniques, such as frequency modulation, amplitude modulation (e.g., M-ary quadrature amplitude modulation, with M a positive integer); phase-shift keying; and so forth).

Access equipment and/or software 2000 related to access of a network also includes a processor 2016 configured to confer, at least in part, functionality to substantially any electronic component in access equipment and/or software 2000. In particular, processor 2016 can facilitate configuration of access equipment and/or software 2000 through, for example, monitor component 2004, antenna component 2006, and one or more components therein. Additionally, access equipment and/or software 2000 can include display interface 2018, which can display functions that control functionality of access equipment and/or software 2000, or reveal operation conditions thereof. In addition, display interface 2018 can include a screen to convey information to an end user. In an aspect, display interface 2018 can be a liquid crystal display, a plasma panel, a monolithic thin-film based electrochromic display, and so on. Moreover, display interface 2018 can include a component (e.g., speaker) that facilitates communication of aural indicia, which can also be employed in connection with messages that convey operational instructions to an end user. Display interface 2018 can also facilitate data entry (e.g., through a linked keypad or through touch gestures), which can cause access equipment and/or software 2000 to receive external commands (e.g., restart operation).

Broadband network interface 2020 facilitates connection of access equipment and/or software 2000 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 2020 can be internal or external to access equipment and/or software 2000, and can utilize display interface 2018 for end-user interaction and status information delivery.

Processor 2016 can be functionally connected to communication platform 2008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 2016 can be functionally connected, through data, system, or an address bus 2022, to display interface 2018 and broadband network interface 2020, to confer, at least in part, functionality to each of such components.

In access equipment and/or software 2000, memory 2024 can retain location and/or coverage area (e.g., macro sector, identifier(s)) access list(s) that authorize access to wireless coverage through access equipment and/or software 2000, sector intelligence that can include ranking of coverage areas in the wireless environment of access equipment and/or software 2000, radio link quality and strength associated therewith, or the like. Memory 2024 also can store data structures, code instructions and program modules, system or device information, code sequences for scrambling, spreading and pilot transmission, access point configuration, and so on. Processor 2016 can be coupled (e.g., through a memory bus), to memory 2024 in order to store and retrieve information used to operate and/or confer functionality to the components, platform, and interface that reside within access equipment and/or software 2000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 2024, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 21:
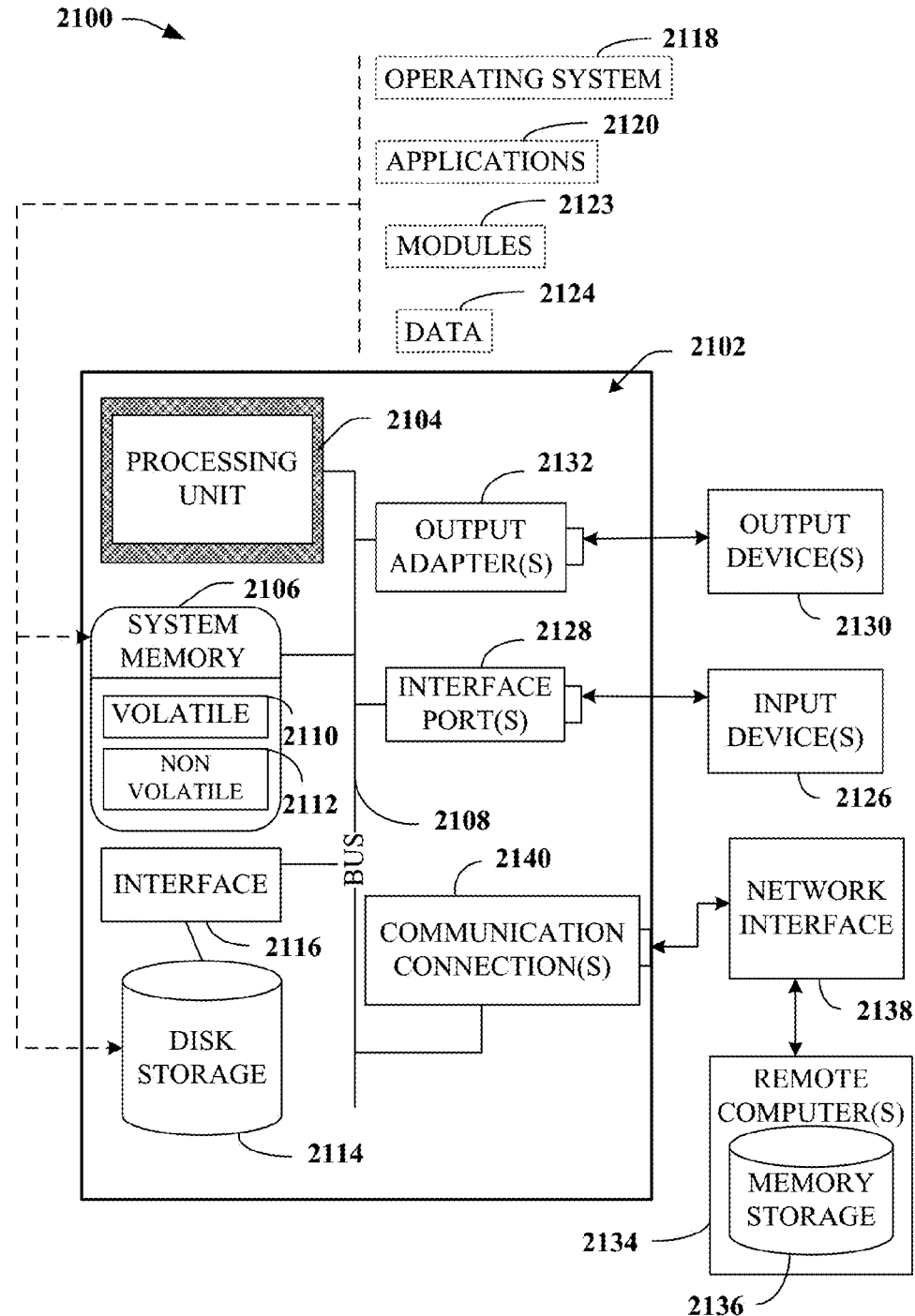
FIG. 21 illustrates a block diagram of a computing system, in accordance with an embodiment.

In order to provide a context for the various aspects of the disclosed subject matter, FIG. 21, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as at least one memory 202) there can be software, which can instruct a processor (such as at least one processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 21, a block diagram of a computing system 2100 operable to execute the disclosed systems and methods is illustrated, in accordance with an embodiment. Computer 2102 includes a processing unit 2104, a system memory 2106, and a system bus 2108. System bus 2108 couples system components including, but not limited to, system memory 2106 to processing unit 2104. Processing unit 2104 can be any of various available processors. Dual microprocessors and other multiprocessor architectures also can be employed as processing unit 2104.

System bus 2108 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 2106 includes volatile memory 2110 and nonvolatile memory 2112. A basic input/output system, containing routines to transfer information between elements within computer 2102, such as during start-up, can be stored in nonvolatile memory 2112. By way of illustration, and not limitation, nonvolatile memory 2112 can include read only memory, programmable read only memory, electrically programmable read only memory, electrically erasable programmable read only memory, or flash memory. Volatile memory 2110 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 2102 also includes removable/non-removable, volatile/non-volatile computer storage media. In an implementation, provided is a non-transitory or tangible computer-readable storage device storing executable instructions that, in response to execution, cause a system comprising a processor to perform operations. The operations can include detecting an uplink interference and downlink interference and mitigating the total amount of interference within the communications network. The operations can also include correcting an imbalance between an uplink path loss and a downlink path loss. Further, the operations can include monitoring a spectral efficiency, adjusting a setting to increase the spectral efficiency, which can be based on a temporal indicator, and monitoring the performance of the communication network after the adjustment.

FIG. 21 illustrates, for example, disk storage 2114. Disk storage 2114 includes, but is not limited to, devices such as a magnetic disk drive, floppy disk drive, tape drive, external or internal removable storage drives, superdisk drive, flash memory card, or memory stick. In addition, disk storage 2114 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 2114 to system bus 2108, a removable or non-removable interface is typically used, such as interface component 2116.

It is to be noted that FIG. 21 describes software that acts as an intermediary between users and computer resources described in suitable operating environment. Such software includes an operating system 2118. Operating system 2118, which can be stored on disk storage 2114, acts to control and allocate resources of computer system 2102. System applications 2120 can take advantage of the management of resources by operating system 2118 through program modules 2122 and program data 2124 stored either in system memory 2106 or on disk storage 2114. It is to be understood that the disclosed subject matter can be implemented with various operating systems or combinations of operating systems.

A user can enter commands or information, for example through interface component 2116, into computer system 2102 through input device(s) 2126. Input devices 2126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2104 through system bus 2108 through interface port(s) 2128. Interface port(s) 2128 include, for example, a serial port, a parallel port, a game port, and a universal serial bus. Output device(s) 2130 use some of the same type of ports as input device(s) 2126.

Thus, for example, a universal serial bus port can be used to provide input to computer 2102 and to output information from computer 2102 to an output device 2130. Output adapter 2132 is provided to illustrate that there are some output devices 2130, such as monitors, speakers, and printers, among other output devices 2130, which use special adapters. Output adapters 2132 include, by way of illustration and not limitation, video and sound cards that provide means of connection between output device 2130 and system bus 2108. It is also noted that other devices and/or systems of devices provide both input and output capabilities such as remote computer(s) 2134.

Computer 2102 can operate in a networked environment using logical connections to one or more remote computers, such as remote computer(s) 2134. Remote computer(s) 2134 can be a personal computer, a server, a router, a network computer, a workstation, a microprocessor based appliance, a peer device, or other common network node and the like, and typically includes many or all of the elements described relative to computer 2102.

For purposes of brevity, only one memory storage device 2136 is illustrated with remote computer(s) 2134. Remote computer(s) 2134 is logically connected to computer 2102 through a network interface 2138 and then physically connected through communication connection 2140. Network interface 2138 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 2140 refer(s) to hardware/ software employed to connect network interface 2138 to system bus 2108. While communication connection 2140 is shown for illustrative clarity inside computer 2102, it can also be external to computer 2102. The hardware/software for connection to network interface 2138 can include, for example, internal and external technologies such as modems, including regular telephone grade modems, cable modems and DSL modems, ISDN adapters, and Ethernet cards.

It is to be noted that aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
   detecting, by a system comprising a processor, a first interference experienced by first network devices of a first cell site and caused by a first mobile device, wherein the first mobile device is within the first cell site of the first network devices and within a second cell site of a second network device, and wherein the first mobile device is in communication with the second network device;
   detecting, by the system, a second interference experienced by a second mobile device in communication with the first network devices and caused by the second network device, wherein the second mobile device is within the first cell site and within the second cell site;
   identifying, by the system, a first radio access technology utilized by the first network devices to communicate and a second radio access technology utilized by the second network device to communicate;
   based on a result of scanning the first cell site, determining, by the system, a bandwidth associated with the first cell site; and
   in response to the identifying, and as a function of a defined time of day and the bandwidth, adjusting, by the system, a setting to reduce a composite interference, wherein the setting is a tilt of an antenna associated with the second mobile device, and wherein the composite interference comprises a combination of the first interference experienced by the first network devices and the second interference experienced by the second mobile device.

2. The method of claim 1, wherein the adjusting comprises:
   receiving, by the system, a first propagation delay and a first radio frequency measurement from the first mobile device, and a second propagation delay and a second radio frequency measurement from the second mobile device;

receiving, by the system, first radio frequency measurements from the first network devices, and second radio frequency measurements from the second network device; and determining, by the system, a first position of the first mobile device and a second position of the second mobile device, based on the first propagation delay, the second propagation delay, the first radio frequency measurement, the second radio frequency measurement, the first radio frequency measurements, and the second radio frequency measurements.

3. The method of claim 1, wherein the detecting the first interference comprises:

measuring, by the system, a total received uplink interference power in different frequencies;

determining, by the system, respective network traffic loads of the first network devices and the second network device;

determining, by the system, a quantity of third devices of cell sites, other than the first cell site and the second cell site, that the first mobile device and the second mobile device are able to detect; and receiving, by the system, third radio frequency measurements from the third devices, and fourth radio frequency measurements from mobile devices, other than the first mobile device and the second mobile device, connected to the third devices.

4. The method of claim 3, further comprising:

adjusting, by the system, a transmission power of the first network devices by an adjustment unit per iteration for a defined number of iterations;

determining, by the system, locations for the first mobile device and the second mobile device; and determining, by the system, that a first location of the locations is within a first network traffic coverage area of the first network devices and a second location of the locations is within a second network coverage area of the second network device, after the adjusting.

5. The method of claim 3, further comprising:

adjusting, by the system, the antenna of the first network devices by an adjustment unit per iteration for a defined number of iterations;

determining, by the system, locations for the first mobile device and the second mobile device; and determining, by the system, that a first location of the locations is within a first network traffic coverage area of the first network devices and a second location of the locations is within a second network coverage area of the second network device, after the adjusting.

6. The method of claim 1, wherein the adjusting the setting results in an adjusted setting, and further comprising:

determining, by the system, a performance indicator has degraded below a threshold value; and in response to the performance indicator being determined to have degraded below the threshold value, reverting, by the system, the adjusted setting to a prior setting.

7. A system, comprising:

a processor; and a memory that stores executable instructions that, when executed by the processor, facilitate performance of operations, comprising:

detecting a first interference associated with first devices of a first cellular region, wherein the first interference is caused by a first femto device, of the first devices, communicating with mobile devices of a second cellular region;

detecting a second interference experienced by a second femto device, of the first devices, communicating with the mobile devices, wherein the second interference is caused by the mobile devices communicating with the first femto device, and wherein the mobile devices are located in the first cellular region and within the second cellular region;

identifying a first radio access technology utilized by the first devices to communicate and a second radio access technology utilized by the mobile devices to communicate;

in response to scanning the first cellular region, determining bandwidth data representative of a bandwidth associated with the first cellular region; and in response to the identifying and the determining the bandwidth data, adjusting a setting associated with an antenna to reduce the first interference, wherein the setting is a tilt of the antenna associated with the second femto device.

8. The system of claim 7, wherein the first interference comprises a combination of interference experienced by the first devices and the mobile devices.

9. The system of claim 7, wherein the operations further comprise:

determining a time of day and an environmental condition; and modifying a downlink power control parameter and an uplink power control parameter based on the time of day and the environmental condition.

10. The system of claim 9, wherein the operations further comprise:

changing a threshold parameter of the first devices based on the time of day.

11. The system of claim 7, wherein the operations further comprise:

adjusting a transmission power associated with the second femto device.

12. The system of claim 7, wherein the adjusting the setting comprises adjusting a position of the antenna.

13. The system of claim 7, wherein the setting is a first setting, and wherein the operations further comprise:

adjusting a second setting to balance an uplink path loss with a downlink path loss associated with the second femto device.

14. The system of claim 7, wherein the adjusting the setting comprises adjusting a pre-configured value of the setting.

15. A non-transitory computer-readable storage medium, comprising executable instructions that, when executed by a processor, facilitate performance of operations, comprising:

detecting a first interference associated with first devices of a first network, wherein the first interference is caused by a first femto device communicating with mobile devices of a second network, and wherein the mobile devices are located in a first region associated with the first devices and within a second region associated with the second network;

detecting a second interference experienced by a second femto device communicating with the first devices, wherein the second interference is caused by the mobile devices communicating with the second femto device;

identifying a first radio access technology utilized by the first devices to communicate and a second radio access technology utilized by the mobile devices to communicate, wherein the first radio access technology is different than the second radio access technology;

based on a result of scanning the first network, determining a bandwidth associated with the first network; and in response to the identifying and the determining, adjusting a setting associated with an antenna associated with the first femto device to reduce the second interference, wherein the setting is an amount of tilt of the antenna.

16. The non-transitory computer-readable storage medium of claim 15, wherein the first radio access technology is a macro cell radio access technology.

17. The non-transitory computer-readable storage medium of claim 15, wherein the second radio access technology is a pico cell radio access technology.

18. The non-transitory computer-readable storage medium of claim 15, wherein the adjusting the setting comprises adjusting the setting based on a time associated with the first interference.

19. The non-transitory computer-readable storage medium of claim 15, wherein the setting is a first setting, and wherein the adjusting the setting comprises adjusting the setting in accordance with a second setting associated with the antenna.

20. The non-transitory computer-readable storage medium of claim 15, wherein the setting is a first setting, and wherein the operations further comprise:

adjusting a second setting associated with the antenna to balance an uplink path loss with a downlink path loss associated with the first femto device.

\* \* \* \* \*